(12) United States Patent
Lill et al.

(10) Patent No.: US 8,862,428 B2
(45) Date of Patent: *Oct. 14, 2014

(54) MACHINE OR DEVICE MONITORING AND ALERT METHOD AND SYSTEM

(71) Applicants: Thomas Martin Lill, Port Huron, MI (US); Ralph Shoemaker, Shelby Township, MI (US)

(72) Inventors: Thomas Martin Lill, Port Huron, MI (US); Ralph Shoemaker, Shelby Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,151

(22) Filed: Nov. 25, 2013

(65) Prior Publication Data

US 2014/0132418 A1 May 15, 2014

Related U.S. Application Data

(63) Continuation-in-part of application No. 13/077,864, filed on Mar. 31, 2011, now Pat. No. 8,594,969.

(60) Provisional application No. 61/341,586, filed on Apr. 1, 2010.

(51) Int. Cl.
   *G06F 11/00* (2006.01)
   *G06F 15/00* (2006.01)
   *G05B 19/042* (2006.01)
   *G08B 21/18* (2006.01)
   *G07C 3/00* (2006.01)

(52) U.S. Cl.
   CPC .......... *G08B 21/182* (2013.01); *G05B 19/0428* (2013.01); *G07C 3/00* (2013.01); *G05B 2219/2642* (2013.01); *G05B 2219/24107* (2013.01); *G05B 2219/24012* (2013.01); *G05B 2219/24099* (2013.01)

USPC ......... 702/141; 65/29.15; 65/158; 73/862.53; 340/539.11; 701/99; 702/188; 702/189

(58) Field of Classification Search
   CPC ............. G05B 19/0428; G05B 19/045; G05B 2219/24099; G05B 2219/2642; G05B 2219/24102; G05B 2219/24107; G01B 1/08; G08B 13/14118; G08B 25/006; D06F 2008/2883; G07C 3/00
   USPC ............. 702/32, 33, 104, 105, 141, 176, 183, 702/188, 189; 8/159; 65/29.15, 158; 73/862.53; 340/511.2, 531, 539.11, 340/679; 379/106.01; 701/99
   See application file for complete search history.

(56) References Cited

U.S. PATENT DOCUMENTS

| | | | |
|---|---|---|---|
| 4,916,439 A | 4/1990 | Estes et al. | |
| 5,089,809 A | 2/1992 | Carmichael, Jr. | |
| 5,680,445 A | 10/1997 | Bogner et al. | |
| 6,424,252 B1 | 7/2002 | Adler | |
| 6,703,930 B2 | 3/2004 | Skinner | |
| 6,784,801 B2 | 8/2004 | Watanabe et al. | |
| 6,873,255 B2 | 3/2005 | Gallagher | |
| 7,409,738 B2 | 8/2008 | Borras | |
| 7,581,272 B2 | 9/2009 | Xie et al. | |
| 8,594,969 B2 * | 11/2013 | Lill et al. | 702/141 |

* cited by examiner

*Primary Examiner* — John H Le

(57) ABSTRACT

The present invention relates to methods and systems for monitoring of one or more machines or devices, such as washers and dryers, for a change of state and indicating when the change of state has occurred. In one aspect, the system comprises a monitor and alert unit which generates a signal indicative of the change of the state of the machine or device being monitored and a device or system to produce an alert notification based upon the signal. The monitor and alert unit includes an operational state sensor, a signal conditioner, and a comparator.

39 Claims, 19 Drawing Sheets

MACHINE OR DEVICE MONITORING AND ALERT METHOD AND SYSTEM

CROSS-REFERENCE TO RELATED APPLICATIONS

The present application is a continuation-in-part of U.S. non-provisional patent application Ser. No. 13/077,864, filed Mar. 31, 2011, which claims the benefit of U.S. Provisional Patent Application No. 61/341,586, filed Apr. 1, 2010, the contents of both being hereby incorporated by reference in their entirety for all purposes.

FIELD OF THE INVENTION

The present invention relates to methods and systems for monitoring of one or more machines or devices, such as washers, dryers, motors, pumps, and transformers for a change of state and indicating when the change of state has occurred.

BACKGROUND

Many households utilize appliances to perform mundane or time consuming tasks, which allows individuals to focus on other daily tasks requiring more attention. Such appliances include washing machines, dryers, dishwashers, microwaves, etc. However, while these appliances are particularly helpful in performing tasks, once operation begins the individual often loses track of the operation cycle of the appliance and the appliance goes unused for lengthy periods of time with the clothes still inside. With respect to dryers, this can a particularly troublesome problem for clothes that require hanging, after drying, to avoid wrinkling. With respect to washing machines, wet clothes left in a washing machine over a prolonged period of time, particularly in tropical conditions, are susceptible to souring, mold, and mildew. This can also be a problem for the user of a washer or dryer, when he or she is relying upon knowing when the washer or dryer has completed its cycle, in order to almost immediately use the clothes contained within the appliance for an appointment or other occasion. In any case, while these appliances often include visual and/or audible indicators for indicating completion of an operation cycle, they are often remotely located or placed in areas that prevent them from being noticed, such as in a basement, a utility room with a tightly closed door, a garage, or some other such (out of the way) location.

Some prior methods and devices have responded by providing indicators for monitoring and alerting a user of the status of an appliance. However, these devices are typically complex in design, costly, require specially trained technician for installation, are impractical, or are just simply inoperable. For example, some systems require modification of the electrical system of the appliance to install monitoring and alert system. However, typically, alterations to appliances void any warrantee that the appliance may have. Also, these systems do not work on all appliances and often generate false completion signals as a result of short interruptions between operation cycle segments. Other systems have utilized plug-in devices, which monitors current to the appliance. However, again, during interruption between cycle segments the lack of current, or low current, creates a false completion signal. Alternatively, some individuals have attempted to track the operation cycle of an appliance through a timing device. However, many new appliances have variable operation time based upon operation necessities. For example, newer dryers periodically monitor moisture content within the dryer to determine completion of drying. As such, drying time continually changes not only between loads, but also during the drying cycle.

Other attempts have provided systems for monitoring appliance vibration and remotely indicating the completion of an appliance cycle. However, it has been discovered that these systems appear inoperable for lack of power, false completion readings, and simply lack enablement. For example, it appears that these devices lack sufficient electrical power for monitoring operation cycle and generating wireless signals, without somehow electrically connecting the device to an AC supply. Also, as often appliances are inadvertently banged, or knocked by other individuals or other appliances, these systems would appear to generate false operation signals. More so, they are not capable of working on new 'quiet' appliances, such as 'quiet washers' and 'quiet dryers', which operate with substantially lower vibration and noise. Finally, such systems do not appear to be in production and do not provide means for overcoming the aforementioned and other inherent problems.

In view of the foregoing, there is a need for improved methods and devices for monitoring operational cycles of one or more appliances or machines, such as washers, dryers, or otherwise, and remotely indicating when such operating cycles have terminated.

SUMMARY OF THE INVENTION

The present invention relates to methods and devices for monitoring appliances, machines, or devices and indicating when a change of state occurs. In one configuration, the features of the present invention are predicated upon new methods and devices for monitoring a change of state of appliances, machines, or devices. In another configuration, the features of the present invention are predicated upon new methods and devices for analyzing and conditioning signals generated by change of state monitors to provide improved accuracy. In still another configuration, the features of the present invention are predicated upon new methods and devices for eliminating false readings. Other advantageous features exist as shown and described herein.

A change of state can be off-to-on, change of a continuous condition (steady state), on-to-off, or some combination thereof.

Selector switch types can be rotary, toggle, slide, micro cycle-through mode switch, or the like. Selector switch circuitry can be as shown in the drawings and drawing descriptions included with this disclosure.

In some embodiments, indicating a change of state or an indicator used to show a change of state comprises a radio frequency (RF) transmission, a visual transmission, an audio transmission, or some combination thereof. An RF transmission can be continuous, periodic, ping, burst, or some combination thereof. A visual transmission can utilize an LED, LCD, incandescent lamp, or the like. The visual transmission can be continuous, blinking, one-shot, or some combination thereof. An audio transmission can be continuous, pulse, intermittent beeps, one-shot audio alert of pre-determined duration, or some combination thereof. In some embodiments, the indication further comprises an e-mail, a cell phone message, message sent via a computing network, or the like.

In one aspect, the present invention provides an appliance or machine monitoring system. The system includes a monitor and transmitter unit configured to monitor an appliance or machine and transmit a wireless signal upon a change of state. The monitor and transmitter unit includes an operational state sensor, the operational state sensor generates signals based upon operation status of an appliance or machine. The monitor and transmitter unit further includes a signal conditioner, the signal conditioner receives and modifies signals generated by the operational state sensor. The monitor and transmitter unit further includes a comparator, the comparator compares amplitude of the modified signals with a predetermined amplitude trip point and generates a signal once the amplitude of the modified signal falls below the predetermined amplitude trip point for a predetermined time period to indicate completion of the operation cycle of the appliance or machine being monitored. The monitor and transmitter unit further includes a wireless transmitter broadcasting a wireless signal based upon the signal generated by the comparator. The system further includes a portable receiver and alert unit configured to receive signals generated by the wireless transmitter and generate a signal indicative of the completion of the operation cycle of the appliance or machine.

In another aspect, the present invention provides an appliance or machine monitoring system. The system includes a monitor and transmitter unit configured to monitor an operation cycle of an appliance or machine and transmit a wireless signal upon completion of the operation cycle. The monitor and transmitter unit includes a three-axis accelerometer sensor, the accelerometer sensor generates signals indicative of acceleration of an appliance or machine along three axes. The monitor and transmitter unit further includes a signal conditioner, the signal conditioner receives and modifies signals generated by the accelerometer sensor to form a moving average amplitude. The monitor and transmitter unit further includes a comparator, the comparator compares the moving average amplitude of the modified signals with a predetermined amplitude trip point and generates a signal once the average amplitude falls below the predetermined amplitude trip point for a predetermined time period to indicate completion of the operation cycle of the appliance or machine being monitored. The monitor and transmitter unit further includes a sensitivity selector switch, the sensitivity selector switch being configured to adjust amplitude of the moving average amplitude, adjust the predetermined amplitude trip point, or both. The monitor and transmitter unit further includes a wireless transmitter, the wireless transmitter broadcasts a wireless signal based upon the signal generated by the comparator. The monitor and transmitter unit further includes a DC battery providing power to the monitor and transmitter unit circuitry. The monitor and transmitter unit includes a housing unit configured for supporting and housing components of the monitor and transmitter unit. The monitor and transmitter unit further includes a releasable attachment unit configured for releasable attachment of the monitor and transmitter unit to a surface of an appliance or machine. The system further includes a portable receiver and alert unit configured to receive signals generated by the wireless transmitter and generate an audio, visual or audio and visual alert indicating completion of the operation cycle of the appliance or machine. The portable receiver and alert unit circuitry being powered by a DC battery.

In another aspect, the present invention provides a method of monitoring an operation cycle of an appliance or machine. The method includes connecting an operational state sensor to an appliance or machine, the operational state sensor generates signals based upon operation cycles of the appliance or machine. The method further includes conditioning the signals generated by the operational state sensor to form a moving average amplitude that is greater than an amplitude setting of a predetermined amplitude trip point when the appliance or machine being monitored is in operation. The method further includes monitoring time periods after the moving average amplitude falls below the amplitude setting of the predetermined amplitude trip point to indicate completion of the operation cycle of the appliance or machine being monitored. The method further includes transmitting a wireless signal after the time period exceeds a predetermined time value. The method further includes generating an audio or visual alert signal with a portable receiver and alert unit based upon the wireless signal received by the portable receiver and alert unit.

The system or method can be applicable to monitoring electro-mechanical, electrical, or electronic devices of any kind including but not limited to internal combustion engines (e.g. automotive vehicles), electrical motors, electrical transformers, electronic computers, cooking appliances, refrigerators, pumps, washers, dryers, air conditioning units, fans, electric heaters, lathes, drill presses, manufacturing machine equipment, ac to dc adapters, or the like.

In some embodiments, the system and method do not require invasive installation to the device being monitored. Instead, the system and method can be mechanically permanently or attached to the device being monitored. In this embodiment, no electrical circuits need to be cut or disassembled to enable monitoring. For example, the system and method could monitor a power cord used to provide power to a monitored apparatus by clamping to the outside of the power cord, hence providing non-invasive monitoring.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

The above-described and other features and advantages of the present invention will be appreciated and understood by those skilled in the art from the following detailed description, drawings, and appended claims.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

The present invention provides methods and devices for monitoring the operation cycle of machines and in one particular application, appliances. Through the feature of the present invention operation cycles of machines can be monitored and a signal sent to a user indicating the completion of the operation cycle. Advantageously, this saves time and money by increasing efficiency of machine production. The features of the present invention are derived, at least in part, upon new operation detection devices and methods. The features of the present invention are also derive, at least in part, upon new signal analysis and conditioning devices and methods to improve accuracy and eliminate false alerts.

The methods and devices can be used in various application including monitoring operational cycles of machines. In one particular application, the methods and devices are used to monitor the operation cycles of appliances, such as washer, dryers, dishwashers, microwaves, etc. However, the methods and devices can be utilized on other machines including, without limitation, sump pumps, environmental temperature chambers, computers, machines with vibration feeders for feeding material into machines and on conveyors, transformers, motors, CNC lathes, CNC Mills, illumination devices, electric generators, combustion engines, water pipes, fans and blowers, or otherwise.

It should be understood that while certain exemplary embodiments, herein, refer to the use of the present invention with appliances, such exemplary embodiments may be equally used with other machines, particularly machines generating displacement characteristics such as displacement, vibration and acceleration, which can be used to monitored an operational condition status thereof. As such, unless otherwise noted, appliances should be defined to include other machines.

Figure 1:
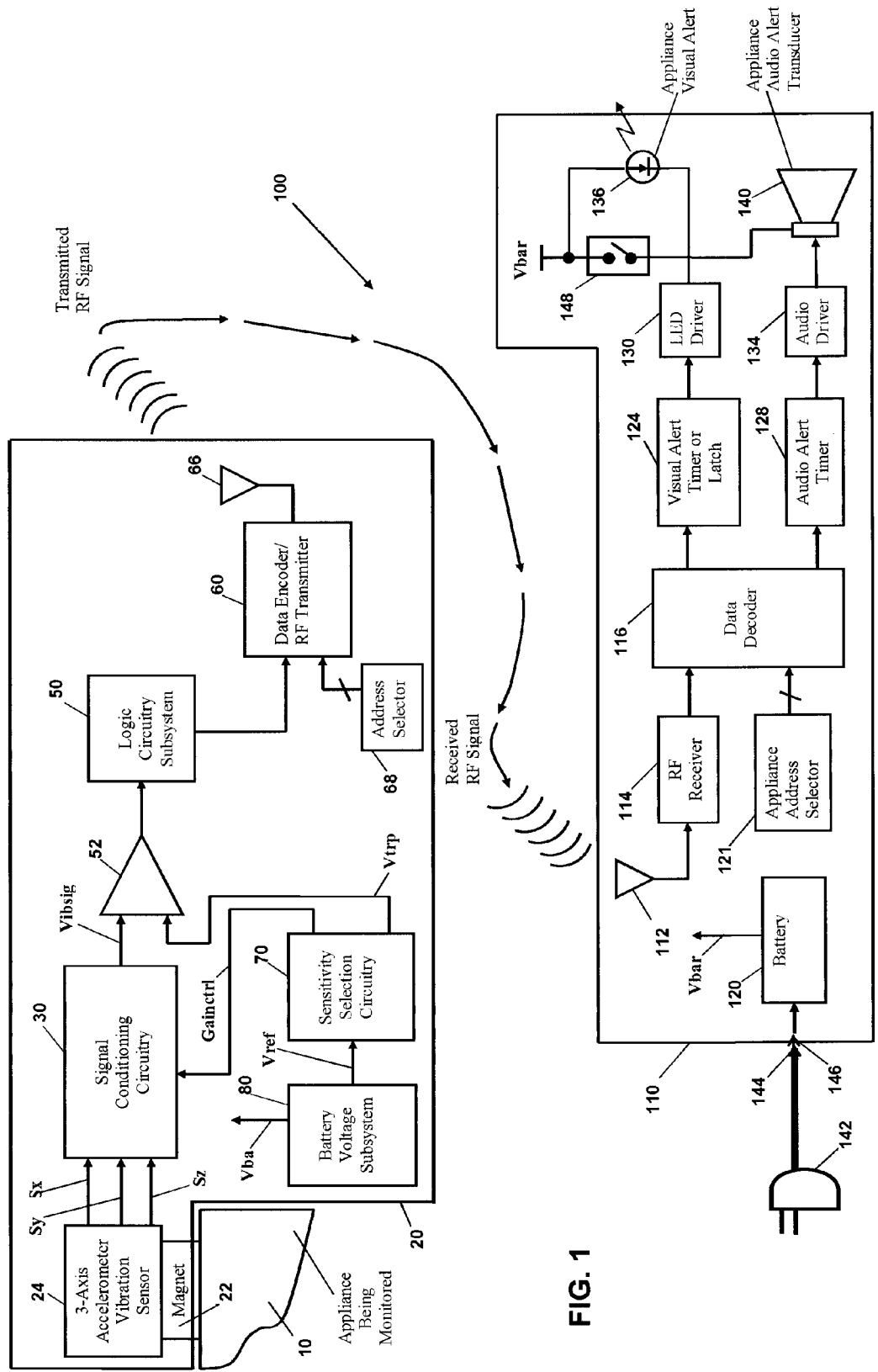
FIG. 1 illustrates a block diagram of an exemplary embodiment of a remote monitor and alert system according to the teachings of the present invention.

In general, referring to FIG. 1, the present invention provides a remote appliance monitoring and alert system 100 for monitoring the operational cycle of an appliance 10. The system 100 includes an operational state sensor, e.g. Vibration Sensor 24, Acceleration Vibration Sensor 24, Magnetic Field Sensor 26 or Audio Microphone Sensor 28, configured to monitor the operational status of appliance 10 and generate a signal therefor. The signal is received by a signal conditioning circuit 30 and a new signal is generated having an average amplitude. The average amplitude is compared with a predetermined amplitude trip point through a comparator 52. Once the average amplitude falls below the predetermined amplitude trip point a wireless signal is broadcasted through RF transmitter 64. The wireless signal is received by receiver alert unit 110, which in one exemplary embodiment is remotely disposed with respect to the remote appliance monitoring and alert system 100, and in one particular exemplary embodiment disposed with a user of the appliance 10. Based upon the signal received from the remote appliance monitoring and alert system 100, the receiver alert unit 110 provides an audio alert, visual alert, or both, indicating that the operational cycle of the appliance 10 is complete.

In greater detail, FIG. 1 illustrates a block diagram of the electrical schematic drawing of the overall electronic system of the Remote Appliance Monitoring and Alert System 100, including the Appliance Monitor and Transmitter Unit 20 and the Receiver/Alert Unit 110. Referring to FIG. 1, a Remote Appliance or Machine Monitoring System 100 is shown. Throughout the remainder of this document, all references to "an appliance", "the appliance" or "the appliance being monitored" shall be equally applicable to and inclusive of any kind of machine which may be monitored using this method and system. System 100 includes an Appliance Monitor and Transmitter Unit 20, hereinafter referred to as AMTU 20, and the Remote Receiver/Alert Unit 110, hereinafter referred to as RRAU 110.

The Appliance Monitor and Transmitter Unit 20 (AMTU 20) of one embodiment of the invention is shown in FIG. 1. This AMTU 20 includes an operational state sensor, such as Vibration Sensor 24 or other operation cycles sensors 24 described herein, an Attachment Apparatus 22 (which is a method to attach AMTU 20 to the Appliance Being Monitored 10 and in this embodiment is a magnet), and Signal Conditioning Circuitry 30, whose output "Vibsig" goes to the positive input of Comparator 52. The negative input of Comparator 52 comes from Sensitivity Selection Circuitry 70. Also, Sensitivity Selection Circuitry 70 sends a "Gainctrl" signal to Signal Conditioning Circuitry 30 in order to control the gain of the amplifiers contained in Signal Conditioning Circuitry 30. AMTU 20 is powered by Battery Voltage Subsystem 80. It provides battery Voltage "Vba" to all of the components contained in the AMTU 20 and provides a voltage reference "Vref" to Sensitivity Selection Circuitry 70. The output of Comparator 52 is sent to Logic Circuitry Subsystem 50, whose output is sent to Data Encoder/RF Transmitter 60. Address Selector 68 allows the user to select a unique digital identification code for the Appliance Being Monitored 10 to be used as part of the RF Transmission. Comparator 52 and Logic Circuitry Subsystem 50 turn on the Data Encoder/RF Transmitter 60 to transmit an RF Data Signal through RF Antenna 66 only when the Appliance Being Monitored 10 has reached its end-of-cycle. The RF Data Transmission sent via RF Antenna 66 is received by the RRAU 110 via RF Receiving Antenna 112.

The RRAU 110 is a portable, battery powered Remote Receiving/Alert Unit that notifies the user that the Appliance Being Monitored 10 has completed its cycle. An example would be a washing machine or a clothes dryer that has completed its laundry cycle. A detailed description of the RRAU 110 components and its operation follows. As stated previously, the end-of-cycle RF Data Transmission from AMTU 20 is received by RF Receiver Antenna 112 and is sent to RF Receiver 114. Its digital output goes to Data Decoder 116. Data Decoder 116 also has an input from Appliance Address Selector 121. Appliance Address Selector 121 is used to set the RRAU 110 digital address to match the digital address selected by the user on the AMTU 20 described above, so as to create a system communication pair. Data Decoder 116 compares the data contained in the transmission sent from the AMTU 20 (and received by RF Receiver 114) with the user selected address generated by Appliance Address Selector 121. If Data Decoder 116 determines that the RF data signal matches the selected address, then it provides alert outputs as discussed below. If the appliance address contained in the incoming RF data signal does not match the selected user address of Appliance Address Selector 121, the RRAU 110 will not output any form of alert to the user. In this embodiment, Data Decoder 116 has two alert outputs. One output goes to Visual Alert Timer or Latch 124 which has an output that goes to LED Driver 130 and turns on Appliance Visual Alert LED 136. The second output of the Data Decoder 116 goes to the Audio Alert Timer 128, whose output goes to Audio Driver 134 and turns on Appliance Audio Alert Transducer 140. The Appliance Visual Alert LED will be latched or activated for a duration determined by the Visual Alert Timer or Latch 124. The Appliance Audio Alert Transducer 140 will be activated for a duration determined by Audio Alert Timer 128, unless it is turned off by the user using Appliance Audio Alert On/Off Switch 148.

The RRAU 110 is a portable module that is powered by DC Battery 120, which supplies battery voltage "Vbar" to all of its components. An AC to DC Wall Adapter 142 can be plugged into the RRAU 110 using Power Plug 144 inserted into Power Receptacle 146. Wall Adapter 142 can also be a 120 VAC to DC docking station and Power Connectors 144 and 146 would be any type of mating power connectors.

Figure 2:
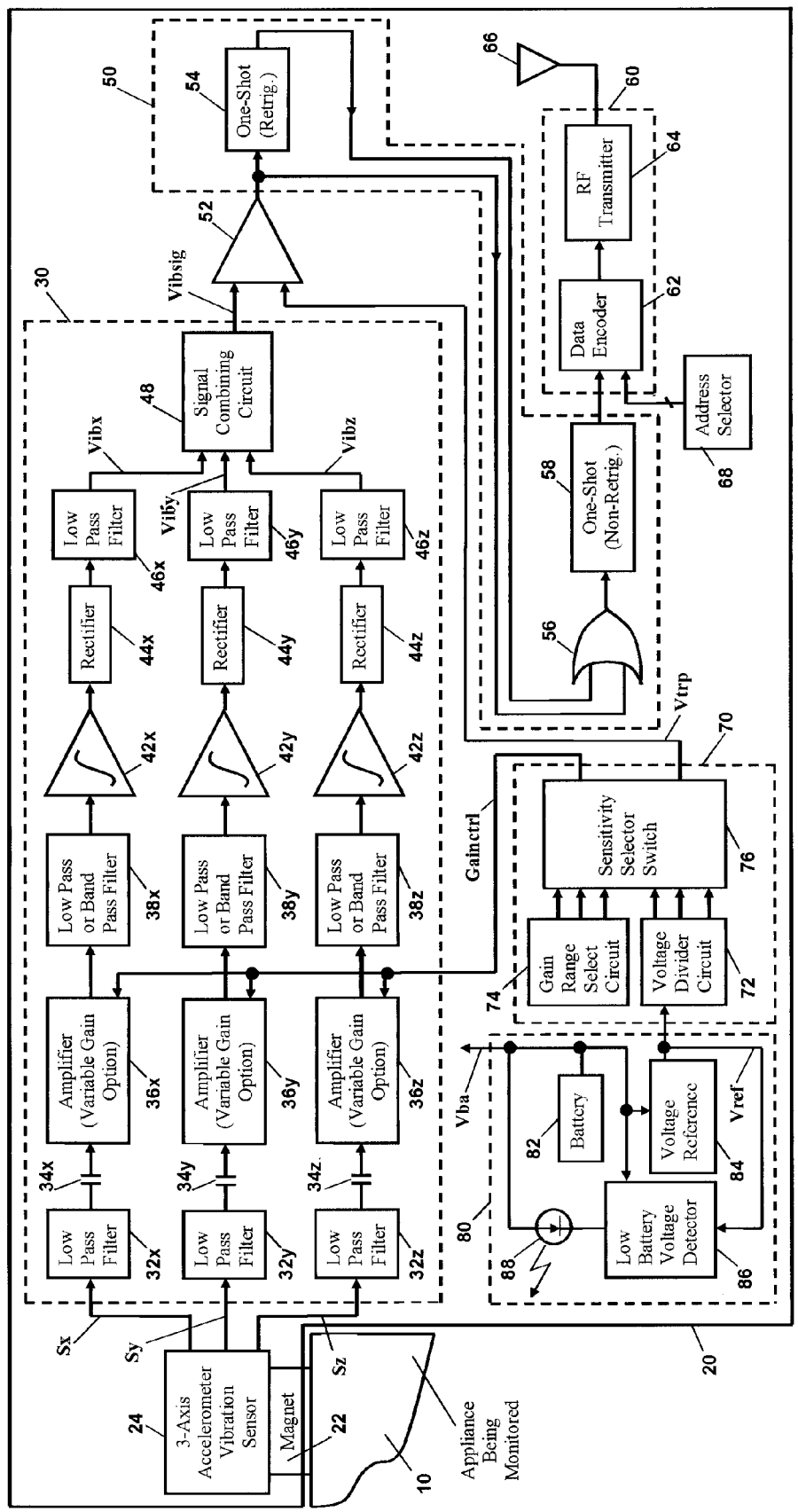
FIG. 2 illustrates a block diagram of an exemplary embodiment of a monitor and transmitter unit according to the teachings of the present invention.

FIG. 2 is a block diagram of the electrical schematic drawing of the electronic system included in the Appliance Monitor and Transmitter Unit 20 (AMTU 20) of one embodiment of the invention, and shows the internal electronic components of AMTU 20. In all the embodiments that will be discussed hereinafter, AMTU 20 is a small, portable, self-contained unit that is powered by Battery 82 and does not need to be plugged into any 120 VAC or 220 VAC outlet. However, this does not preclude a version of the AMTU powered by a 120 VAC or 220 VAC power source. In this embodiment, the self-contained AMTU 20 includes Attachment Apparatus 22, which in this case is a magnet, appliance Vibration Sensor 24, Signal Conditioning Circuitry 30, Comparator 52, Logic Circuitry Subsystem 50, Battery Voltage Subsystem 80, Sensitivity Selection Circuitry 70, Address Selector 68, Data Encoder 62, RF (Radio Frequency) Transmitter 64, and Antenna 66. Antenna 66 can either be a short wire antenna extending from AMTU 20 or an antenna that is an integral part of the PC (Printed Circuit) board used for the electronics of AMTU 20. AMTU 20 is attached by the user to any metallic (ferro-magnetic material) location on the Appliance Being Monitored 10 (using the magnetic force from Magnet 22). In this embodiment, appliance Vibration Sensor 24 is a small, 3-axis accelerometer, preferably surface mounted to the electronics' PC board. The raw signal outputs (Sx, Sy, Sz) of 3-Axis Accelerometer Vibration Sensor 24 are directly related to the movement (or more correctly, the mathematical first derivative of the movement (i.e., the acceleration)) of the Appliance Being Monitored 10. For the purposes of this discussion, we will only be describing the x-axis signal path, however, the y-axis and z-axis have signal paths that are identical, with the identical components for each path being labeled x, y, or z respectively. Signal Sx is first sent to Low Pass Filter 32x and then through DC (direct current) blocking Capacitor 34x to signal conditioning Amplifier 36x. We are interested in the alternating current (AC) portion of the acceleration sensor signals (Sx, Sy, Sz) because the AC signals are an indication of the movement of the Appliance Being Monitored 10. The DC portion of most new accelerometers is an indication of the earth's gravitational acceleration, and is often used for measurements of angle. In this embodiment, Amplifiers 36x, 36y, and 36z are variable gain amplifiers, with the gain being controlled by the "Gainctrl" signal from Sensitivity Selector Switch 76, so as to provide the optimum gain for the particular Appliance Being Monitored 10. The amplified signal from Amplifier 36x is sent to Low Pass or Band Pass Filter 38x, which consists of a first (or higher) order low pass filter or a first (or higher) order band pass filter. The break points of this filter are determined empirically and are optimized for the appliances being monitored, so as to eliminate as much unwanted high frequency mechanical and electrical noise as possible. In this embodiment, the AC output signal of Low Pass or Band Pass Filter 38x is sent to Mathematical Integrator Circuit 42x. Mathematically integrating the acceleration signal from accelerometer Vibration Sensor 24 provides the true velocity signal of the mechanical vibration of the Appliance Being Monitored 10. It also eliminates the high frequency bias added by an accelerometer vibration sensor, so as to eliminate even more unwanted high frequency mechanical and electrical noise. This is explained in greater detail in the following description. During its operation, the Appliance Being Monitored 10 often vibrates at several velocities (each of which is defined in units of displacement per unit of time) at different AC frequencies: $f_1$, $f_2$, $f_3$, etc. We will concentrate on just the most prominent sinusoidal vibration velocity and call it $Vib_1$:

$$Vib_1 = B_1 * \cos(2 * \pi * f_1 * t),$$

where $B_1$=Maximum amplitude of $Vib_1$ at frequency $f_1$; $f_1$=frequency of $Vib_1$; t=time. The output of accelerometer Vibration Sensor 24 is the first derivative of this vibration with respect to time, t, where:

$$\text{Accelerometer output:} S_1 = Acc_1 = d(Vib_1)/dt = -2 * \pi * f_1 * B_1 * \sin(2 * \pi * f_1 * t)$$

As can be seen from this equation, the absolute value of the maximum amplitude of an accelerometer output in general at any frequency, f, is $|-2 * \pi * f * B|$ and, thus, includes a frequency, f, multiplier term. Therefore, the accelerometer's output increases as frequency, f, increases for a given amplitude of velocity. Many slight mechanical noise vibrations occur at higher frequencies. Hence, an accelerometer will accentuate these noise vibrations and create a false indication of operation of an appliance or machine being monitored. In this embodiment of the invention, AMTU 20 includes Mathematical Integrators 42x, 42y, and 42z. They perform integration of sinusoidal signals from the accelerometer. An integrated sinusoidal signal includes a "(1/frequency)" term and thus cancels out the frequency, f, term in the accelerometer output equation shown above. Hence the mathematical integrators act as a noise reduction technique.

The output of Mathematical Integrator Circuit 42x is sent to Rectifier 44x. In this embodiment, Rectifiers 44x, 44y, and 44z are full-wave precision rectifiers, but less precise half-wave rectifiers could be used. The output of Rectifier 44x goes to very low frequency Low Pass Filter 46x (with a breakpoint frequency of less than 0.5 Hz) to remove as much AC ripple as possible from the full-wave rectified vibration signal. Thus, the output of Low Pass Filter 46x (Vibx) is a slowly moving DC voltage whose amplitude is directly related to the amplitude of the vibration (movement) in the x-axis of the Appliance Being Monitored 10. Similarly, the output amplitudes of Low Pass Filter 46y (Viby) and Low Pass Filter 46z (Vibz) are directly related to the amplitudes of the vibration (movement) in the y-axis and z-axis, respectively, of the Appliance Being Monitored 10. These signals (Vibx, Viby, and Vibz) are now combined in Signal Combining Circuit 48 to yield a combined vibration signal output called "Vibsig." In one embodiment of the invention, Signal Combining Circuit 48 is a simple summing circuit where:

$$\text{Vibsig}=K_1*[(\text{Vib}x)+(\text{Vib}y)+(\text{Vib}z)]$$

$K_1$ is a constant which is empirically derived such that the output of Signal

Combining Circuit 48 does not saturate for reasonable values of Vibx, Viby, and Vibz. In a second embodiment of the invention, Signal Combining Circuit 48 derives the output "Vibsig" according to the following equation (often called the "square root of the sum of the squares" equation):

$$\text{Vibsig}=K_2*\sqrt{[(\text{Vib}x)^2+(\text{Vib}y)^2+(\text{Vib}z)^2]}$$

$K_2$, like $K_1$, is a constant which is empirically derived such that "Vibsig" does not saturate for reasonable values of Vibx, Viby, and Vibz.

However it is derived by Signal Combining Circuit 48, "Vibsig" is sent to the positive input of Comparator 52. The purpose of Comparator 52 is to trip high when the amplitude of the appliance's vibration is above some predetermined value, which means the appliance is still in operation. Comparator 52 has a small amount of hysteresis, produced by using a small amount of positive feedback around the comparator, to reduce false triggering. The negative input of Comparator 52 is connected to "trip-point" reference voltage "Vtrp," which is created in the following manner. Several precision reference voltages are first created from precision Voltage Reference 84 using resistive Voltage Divider Circuit 72. In this embodiment there are three reference voltages created by Voltage Divider Circuit 72: a "sensitive vibration" reference voltage, a "normal vibration" reference voltage, and a "high vibration" reference voltage. One of these reference voltages is selected by the operator using Sensitivity Selector Switch 76 to become the "trip-point" reference voltage "Vtrp" sent to Comparator 52. In other embodiments, there could easily be fewer or larger numbers of reference voltages created by modifying resistive Voltage Divider Circuit 72, if desired. Sensitivity Selector Switch 76 would then need fewer or larger numbers of selector positions accordingly. The determination of the various values to be used for these "trip-point" reference voltages is done by empirically testing many appliances for typical operating vibrations using Vibration Sensor 24 in order to provide "vibration profiles" for each of the appliances. Thus, the invention will be optimized for a wide range of appliances being monitored, each having different levels of vibration and noise generated during their normal operation.

A discussion of the importance of Sensitivity Selector Switch 76 is in order. There are many new washers and dryers specifically being marketed as "quiet" appliances, which produce very little vibration. For such state of the art appliances, a "very sensitive" "trip-point" voltage (i.e., "Vtrp" equals some small voltage) would be required for AMTU 20 to detect the very small amplitude vibrations produced by these devices. This can be considered case 1. It should be noted, however, such a "very sensitive" "trip-point" will also make AMTU 20 more sensitive to extraneous mechanical "noise," and therefore should only be used when the Appliance Being Monitored 10 truly needs such sensitivity. For many older washers, dryers, or other appliances already out in the marketplace, a larger amount of vibration is produced than the "quiet" appliances in normal operation. Therefore, a higher "trip-point" voltage (i.e., "Vtrp" equals some higher voltage) would allow for more movement before tripping Comparator 52, so as to reduce false triggering due to extraneous mechanical movements produced by bumping the appliance or from other sources of extraneous mechanical "noise." This could be called a "medium sensitivity" "trip-point" voltage for AMTU 20, and can be considered case 2. And finally, for washers and dryers that may be placed on weak flooring, a larger amount of vibration may be produced than either case 1 or case 2 appliances during normal operation. This is due to the large movement created by the flooring, when the appliance is in operation. In this case 3, a higher "low sensitivity" "trip-point" voltage than was used in case 2 would allow for even more movement before tripping Comparator 52, so as to reduce false triggering due to extraneous mechanical movements. Thus, it can be seen that Sensitivity Selector Switch 76 is used to help AMTU 20 more closely and effectively monitor the vibration of the particular Appliance Being Monitored 10 to which it is attached. It helps AMTU 20 determine when the specific appliance it is monitoring is in its normal operation or is off, while reducing false triggerings of these conditions. Therefore, not only can it effectively change the vibration sensitivity of AMTU 20, it can also be considered a mechanical "noise" reduction technique (or a technique to reduce false triggerings) for AMTU 20.

In this embodiment, Sensitivity Selector Switch 76 is a double-pole triple-throw type switch. Thus far we have discussed the first pole of this switch. The input of the second pole of this switch is derived from Gain Range Select Circuit 74. By changing the Sensitivity Selector Switch 76, the appropriate gain of Amplifier 36x, Amplifier 36y, and Amplifier 36z will be selected. The output of Comparator 52 is sent to a Retriggerable One-Shot 54 and to one input of OR Gate 56. The output of Retriggerable One-Shot 54 goes to the second input of OR Gate 56. Retriggerable One-Shot 54 is negative-edge triggered. When the vibration drops below trip point "Vtrp" for brief periods of time, Retriggerable One-Shot 54 is triggered and the output of OR Gate 56 remains high. This is to alleviate the problem of short duration drop-outs in the vibration of the Appliance Being Monitored 10. Once the vibration has dropped below the trip point "Vtrp" permanently, due to the appliance reaching its end-of-cycle, One-Shot 54 will re-trigger for a fixed duration without any further re-triggering. This last trigger event of One-Shot 54 will finish at a logic level zero and cause Or Gate 56 to drop to a logic level zero, which will trigger One-Shot 58, which is a negative edge triggered One-Shot. The purpose of the output of One-Shot 58 is to turn on RF Transmitter 64 through Data Encoder 62 only once at the end-of-cycle of the Appliance Being Monitored 10. One-Shot 58 is thus a non-retriggerable one-shot. The Data Encoder adds a preselected appliance Identification Address from Address Selector 68 to the End-of-Cycle Alert Code. In this embodiment, Address Selector 68 provides an eight-bit address code, which means the user can select one of 256 unique address codes. The End-Of-Cycle Alert Code can be as simple as 1 bit of data or can be more complex. The RF Transmitter 64 sends its RF signal through Antenna 66 to the RF Receiver/Alert Unit 110 of FIG. 1. For clarity, it should be noted that Data Encoder/RF Transmitter 60 depicted in FIG. 1 is the combination of Data Encoder 62 and RF Transmitter 64.

Finally, Battery Voltage Subsystem 80, consists of Battery 82, Voltage Reference 84, Low Battery Voltage Detector 86, and Low Battery Voltage LED 88. Battery 82 provides voltage "Vba" to all the electronic components of AMTU 20. It also supplies voltage to Voltage Reference 84, which creates very stable Reference Voltage "Vref". Low Battery Voltage Detector 86 monitors Battery Voltage "Vba" and uses "Vref" to determine when the battery voltage is low. If the battery voltage is low, it turns on Low Battery Voltage LED 88 to provide visual indication of the low battery condition.

It is important to note the unique method of sensing vibration of an appliance or machine (being monitored) detailed in this embodiment of the invention, namely using a 3-Axis Accelerometer as Vibration Sensor 24. Using a 3-Axis Accelerometer for Vibration Sensor 24 is superior in detection of vibration for this application for several reasons. A single-axis Vibration Sensor 24, (i.e., either a single-axis accelerometer or a single-axis velocity sensor) may not optimally monitor an appliance's vibration, because the vibration may predominately occur in either of the two axes not monitored. Most readily available velocity sensors are of the single-axis variety. To help alleviate this problem, using a two-axis accelerometer for Vibration Sensor 24 is better than a single-axis version, but again, such a sensor may not optimally monitor an appliance's vibration, because the vibration may predominately occur in the third axis not monitored, which is even more likely to occur with the new "quiet" appliances. By using a 3-Axis Accelerometer, it does not matter at which angle AMTU 20 is attached to the Appliance Being Monitored 10, since all axes are being monitored. By summing the signals (or otherwise mathematically combining the signals, as described above) from all three axes, the best method of monitoring an appliance's or a machine's vibration profile or vibration characteristics (no matter in which axis they predominately occur) can be achieved by AMTU 20 for optimum vibration detection.

Figure 3:
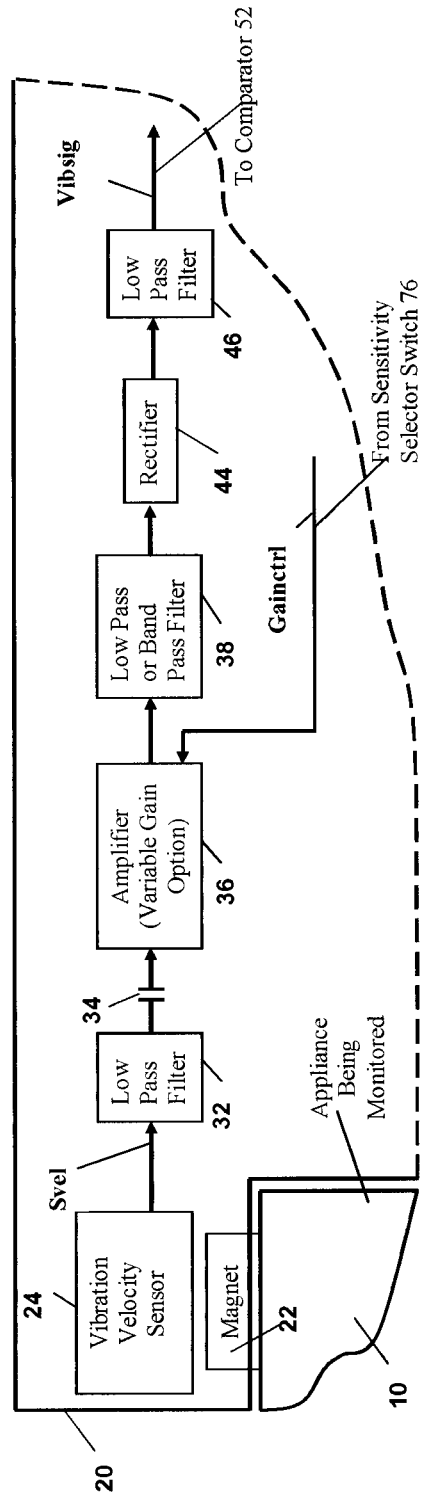
FIG. 3 illustrates a partial view of a block diagram of another exemplary embodiment of a monitor and transmitter unit according to the teachings of the present invention.

FIG. 3 is a block diagram of the electrical schematic drawing of the electronic system included in the Appliance Monitor and Transmitter Unit 20 (AMTU 20) of another embodiment of the invention in which the Vibration Sensor 24 is a single axis velocity sensor. Note that this vibration sensor is not an accelerometer, but its output is the vibration velocity of the Appliance Being Monitored 10, i.e., the first derivative of displacement, or d(displacement)/dt. The output of vibration velocity sensor 24 is "Svel" and is sent through Low Pass Filter 32 and DC Blocking Capacitor 34 to variable gain Amplifier 36. The gain of Amplifier 36 is controlled by signal "Gainctrl", which comes from Sensitivity Selector Switch 76 and is derived by Gain Range Select Circuit 74, as given in the description for FIG. 2. The output of Amplifier 36 is sent through a Low Pass or Band Pass Filter 38. The gain ranges of Amplifier 36 and the frequency breakpoints of Filter 38 are optimized for the signal output of Vibration Velocity Sensor 24. Note, that because the output of Vibration Velocity Sensor 24 in this embodiment is already a velocity signal, no mathematical integration is required as may be used in the embodiment shown in FIG. 2, which uses an accelerometer. Rectifier 44 and Low Pass filter 46 both act exactly as those described in FIG. 2. The output "Vibsig" of Low Pass filter 46 goes to the positive input of Comparator 52. All of the remaining circuitry of the AMTU 20 for this embodiment of the invention, which is not shown in FIG. 3, acts exactly as detailed in the description of the embodiment of FIG. 2.

Figure 4:
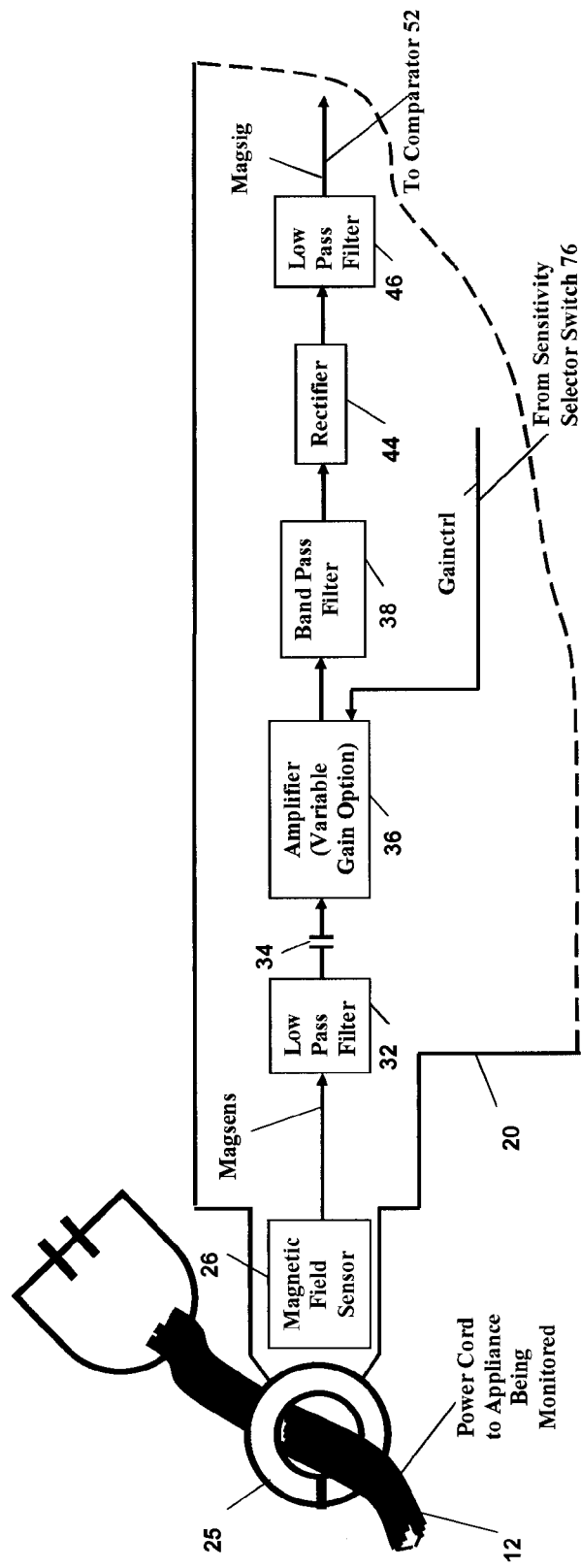
FIG. 4 illustrates a partial view of a block diagram of another exemplary embodiment of a monitor and transmitter unit according to the teachings of the present invention.

FIG. 4 is a block diagram of the electrical schematic drawing of the electronic system included in the Appliance Monitor and Transmitter Unit 20 (AMTU 20) of another embodiment of the invention. This embodiment the operational state sensor comprises a Magnetic Field Sensor 26 instead of a vibration sensor to determine when the Appliance Being Monitored 10 is in operation. It does so by measuring the amplitude of the magnetic field surrounding Power Cord 12, which is directly related to the amplitude of the electrical current being drawn by the Appliance Being Monitored 10 through Power Cord 12. Magnetic Field Sensing Ring 25 is an electrically isolated ring that surrounds Power Cord 12 and concentrates the magnetic field of the power cord for Magnetic Field Sensor 26. Magnetic Field Sensing Ring 25 can be a clamp-on type ring that can be attached by any user. Such a clamp on type of ring requires no wiring or electrical connection to the power source of the Appliance Being Monitored 10, and, thus, maintains a high degree of safety for any user of this monitoring system. Magnetic Field Sensor 26 could either be a Hall-Effect Sensor or an inductive coil similar to a telephone pickup coil. The output of Magnetic Field Sensor 26 is "Magsens" and is sent through Low Pass Filter 32 and DC Blocking Capacitor 34 to variable gain Amplifier 36. The gain of Amplifier 36 is controlled by signal "Gainctrl", which comes from Sensitivity Selector Switch 76 and is derived by Gain Range Select circuit 74 as detailed in the description for FIG. 2. The output of Amplifier 36 is sent through Band Pass Filter 38, which is centered around 60 Hz and is the frequency of the power applied to the Appliance Being Monitored 10. The gain ranges of Amplifier 36 are optimized for the Magnetic Field Sensor's signal. Rectifier 44 and Low Pass filter 46 both act exactly as those shown in FIG. 2. The output "Magsig", of Low Pass filter 46 goes to the positive input of Comparator 52. All of the remaining circuitry of the AMTU 20 for this embodiment of the invention, which is not shown in FIG. 4, acts exactly as detailed in the description of the embodiment of FIG. 2.

Figure 5:
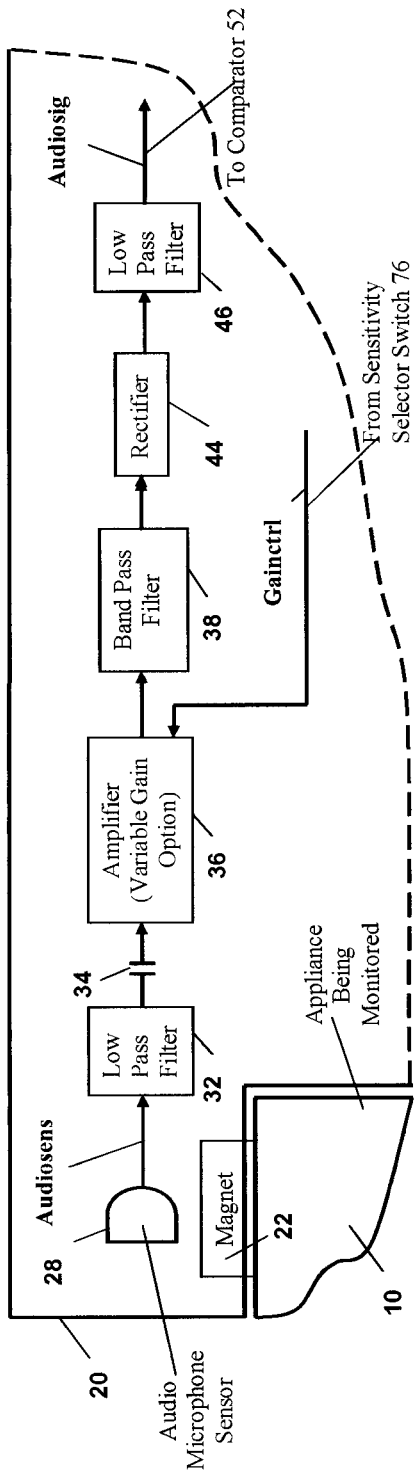
FIG. 5 illustrates a partial view of a block diagram of another exemplary embodiment of a monitor and transmitter unit according to the teachings of the present invention.

FIG. 5 is a block diagram of the electrical schematic drawing of the electronic system included in the Appliance Monitor and Transmitter Unit 20 (AMTU 20) in another embodiment of the invention which uses an Audio Microphone Sensor 28, instead of a vibration sensor, as an operational state sensor. Audio Microphone Sensor 28 is used to monitor noises associated with the operation of the Appliance Being Monitored 10, either transmitted through the air or mechanically coupled through the appliance's chassis. It also can monitor end-of-cycle audio alerts provided by the appliance. The output of Audio Microphone Sensor 28 is "Audiosens" and is sent through Low Pass Filter 32 and DC Blocking Capacitor 34 to variable gain Amplifier 36. The gain of Amplifier 36 is controlled by signal "Gainctrl", which comes from Sensitivity Selector Switch 76 and is derived by Gain Range Select circuit 74 as detailed in the description for FIG. 2. The output of Amplifier 36 is sent through Band Pass Filter 38. The gain ranges of Amplifier 36 and the frequency breakpoints of Band Pass Filter 38 are optimized for the Audio Microphone's signal output. Rectifier 44 and Low Pass Filter 46 both act exactly as those shown in FIG. 2. The output "Audiosig", of Low Pass Filter 46 goes to the positive input of Comparator 52. All of the remaining circuitry of the AMTU 20 for this embodiment of the invention, which is not shown in FIG. 5, acts exactly as detailed in the description of the embodiment of FIG. 2.

Figure 6:
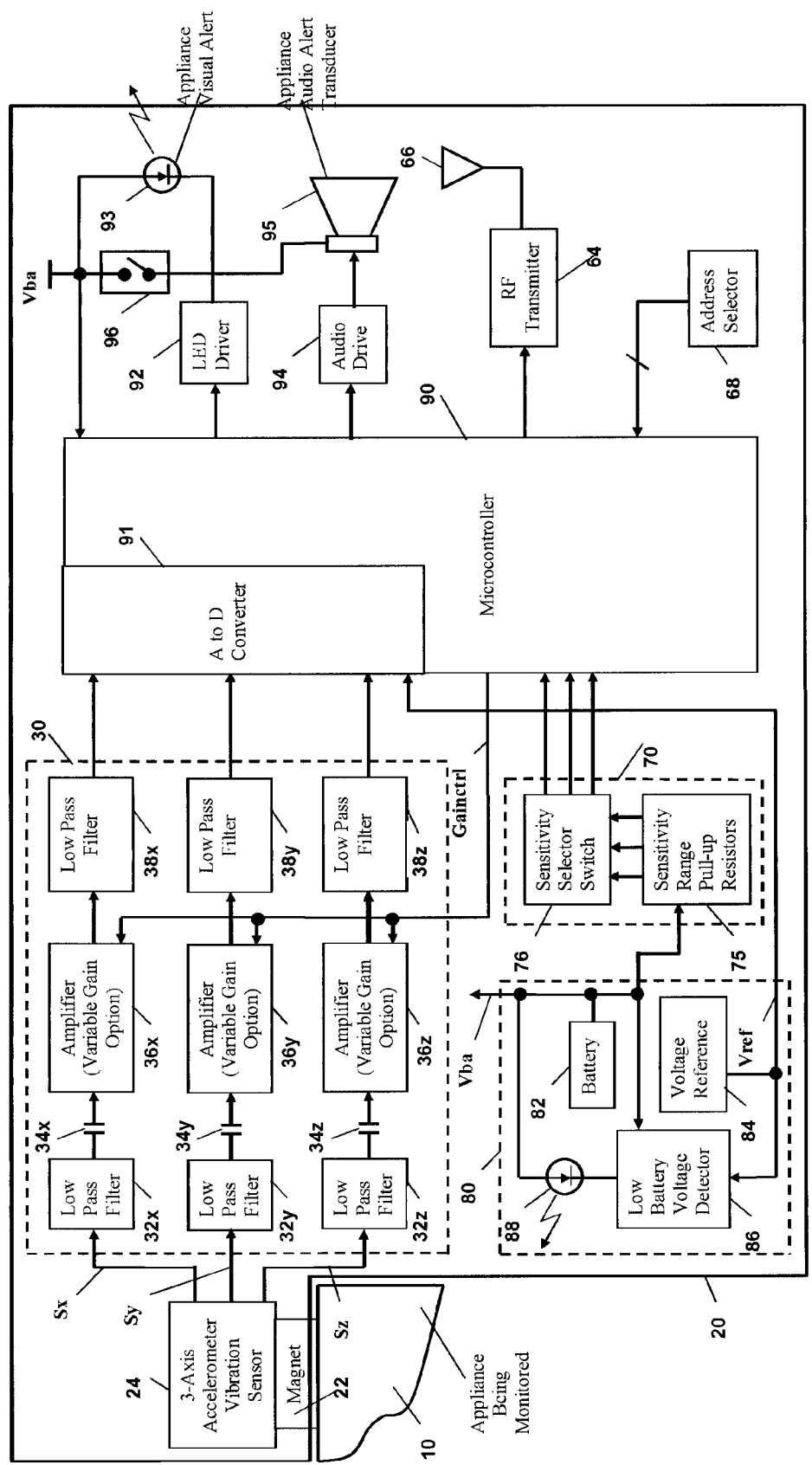
FIG. 6 illustrates a block diagram of another exemplary embodiment of a monitor and transmitter unit according to the teachings of the present invention.

FIG. 6 is a block diagram of the electrical schematic drawing of the electronic system included in the Appliance Monitor and Transmitter Unit 20 (AMTU 20) of another embodiment of the invention. This embodiment shows an AMTU 20 which utilizes a microcontroller to replace much of the electronic circuitry described in the embodiment of FIG. 2. In this embodiment, the self-contained AMTU 20 includes Attachment Apparatus 22 (which is a magnet in this embodiment), Appliance Vibration Sensor 24, Signal Conditioning Circuitry 30, Sensitivity Selection Circuitry 70, Battery Voltage Subsystem 80, Address Selector 68, Microcontroller 90, the visual and audio alert electronics described below, RF (Radio Frequency) Transmitter 64, and Antenna 66. Antenna 66 can be implemented as is detailed in the discussion of FIG. 2. AMTU 20 is attached by the user to any metallic (ferromagnetic material) location on the Appliance Being Monitored 10 (using the magnetic force from Magnet 22). In this embodiment, Appliance Vibration Sensor 24 is a small, 3-axis accelerometer, such as that previously used in the embodiment shown in FIG. 2, preferably surface mounted to the electronics' PC board. As in the embodiment shown in FIG. 2, the raw signal outputs (Sx, Sy, Sz) of 3-Axis Accelerometer Vibration Sensor 24 are directly related to the movement (or more correctly, the mathematical first derivative of the movement (i.e., the acceleration)) of the Appliance Being Monitored 10. For the purposes of this discussion, we will only be describing the x-axis signal path. However, the y-axis and z-axis have signal paths that are identical, with the identical components for each path being labeled x, y, or z respectively. Signal Sx is first sent to Low Pass Filter 32x and then through DC (direct current) Blocking Capacitor 34x to signal conditioning Amplifier 36x. As previously stated in the FIG. 2 discussion, we are only interested in the alternating current (AC) portion of the acceleration sensor signals (Sx, Sy, Sz) because the AC signals are an indication of the movement of the Appliance Being Monitored 10. In this embodiment, Amplifier 36x is a variable gain amplifier, with the gain being controlled by the "Gainctrl" signal, which is an output from Microcontroller 90. The amplified signal from Amplifier 36x is sent to Low Pass Filter 38x, which consists of a first (or higher) order low pass filter. Low Pass Filter 38x is an anti-aliasing low pass filter for A to D Converter 91 of Microcontroller 90. A to D Converter 91 rapidly digitizes the analog signal from Low Pass Filter 38x and the A to D results are stored in Microcontroller 90. Microcontroller 90 contains RAM, ROM, and a CPU, and performs a software algorithm. In this embodiment, the software algorithm of Microcontroller 90 performs the operations of Integrator 42x, Rectifier 44x, and Low Pass Filter 48x detailed in the description of FIG. 2. The discussions for the y-axis and z-axis signal paths, functional circuit blocks, and associated software are essentially identical to those just described for the x-axis. In this embodiment, signals Vibx, Viby, and Vibz are created internally in Microcontroller 90. The software of Microcontroller 90 performs the mathematical operation of the Signal Combining Circuit 48 shown in FIG. 2. It either performs the simple summing equation or the more complex "square root of the sum of the squares" equation for Vibx, Viby, and Vibz, described in great detail in the discussion of FIG. 2, and produces the signal "Vibsig". As with the embodiment of FIG. 2, AMTU 20 is powered by Battery Voltage Subsystem 80. It provides battery Voltage "Vba" to all of the components contained in the AMTU 20, has a Low Battery Voltage Detector 86 and Low Battery Voltage Detector LED 88, and Precision Voltage Reference 84, which provides "Vref" as an input to A to D Converter 91. Microcontroller 90 uses the "Vref" input to create several precision reference voltages. In this case, it performs the function of the resistive Voltage Divider Circuit 72 of FIG. 2. In this embodiment there are three reference voltages created internally from "Vref" by Microcontroller 90: a "sensitive vibration" reference voltage, a "normal vibration" reference voltage, and a "high vibration" reference voltage. One of these reference voltages is selected by the operator using Sensitivity Selector Switch 76, whose operation is described below, to become the "trip-point" reference voltage "Vtrp". In this embodiment of the invention, three digital signal inputs are created by three Sensitivity Range Pull-up Resistors 75 connected to three digital inputs of Microcontroller 90. These inputs are also connected to the three positions of single pole, triple throw Sensitivity Selector Switch 76, whose center pole is grounded. By selecting one of the three positions of the switch, one of the Microcontroller 90 signal inputs is grounded, and a Sensitivity Range is selected. This not only selects the value of "Vtrp", but also one of the three "Gainctrl" signals sent to Amplifiers 36x, 36y, and 36z. Microcontroller 90 performs the function of Gain Range Select Circuit 74 shown in FIG. 2 to create these three gain control signals. Microcontroller 90 also performs the function of Comparator 52 shown in FIG. 2, which is to trip high when the amplitude of the appliance's vibration is above the selected predetermined value "Vtrp" (and means the appliance is still in operation). A small amount of hysteresis is added to this pseudo comparator trip point by the software of Microcontroller 90. In addition, Microcontroller 90 performs the functions of One-Shot 54, Or Gate 56, and One-Shot 58 (Logic Circuitry Subsystem 50), whose operations are discussed in the description of FIG. 2. The software of Microcontroller 90 emulates the decision making operation of Comparator 52 and Logic Circuitry Subsystem 50 (detailed in the discussion of FIG. 2). It will turn on RF Transmitter 64 to transmit an RF Data Signal through RF Antenna 66 only when the Appliance Being Monitored 10 has reached its end-of-cycle. Address Selector 68 allows the user to select a unique digital identification code for the Appliance Being Monitored 10 to be used as part of the RF Transmission. In this embodiment, it provides an eight-bit digital input signal to Microcontroller 90, which performs the function of Data Encoder 62 of FIG. 2, and adds this address to the AMTU's RF Transmission. Also, in this embodiment of the invention, local visual and audio alerts have been added to AMTU 20 itself, as shown in FIG. 6. When the Appliance Being Monitored 10 has reached its end-of-cycle and the AMTU 20 sends an RF Transmission, Microcontroller 90 does the following. First, it performs the function of a Visual Alert Timer or Latch (similar to the Visual Alert Timer or Latch 124 of RRAU 110 shown in FIG. 1) and sends an output signal to LED Driver 92 that turns on Appliance Visual Alert LED 93 on the outside of AMTU 20. Secondly, it performs the function of an Audio Alert Timer (similar to the Audio Alert Timer 128 of RRAU 110 shown in FIG. 1) and sends an output signal to Audio Driver 94 that turns on Appliance Audio Alert Transducer 95 contained within AMTU 20. The Appliance Visual Alert LED 93 will be latched or activated for a duration pre-determined by the software of Microcontroller 90. Similarly, the Appliance Audio Alert Transducer 95 will be activated for a duration pre-determined by the software of Microcontroller 90, unless it is turned off by the user using Appliance Audio Alert On/Off Switch 96.

Figure 7:
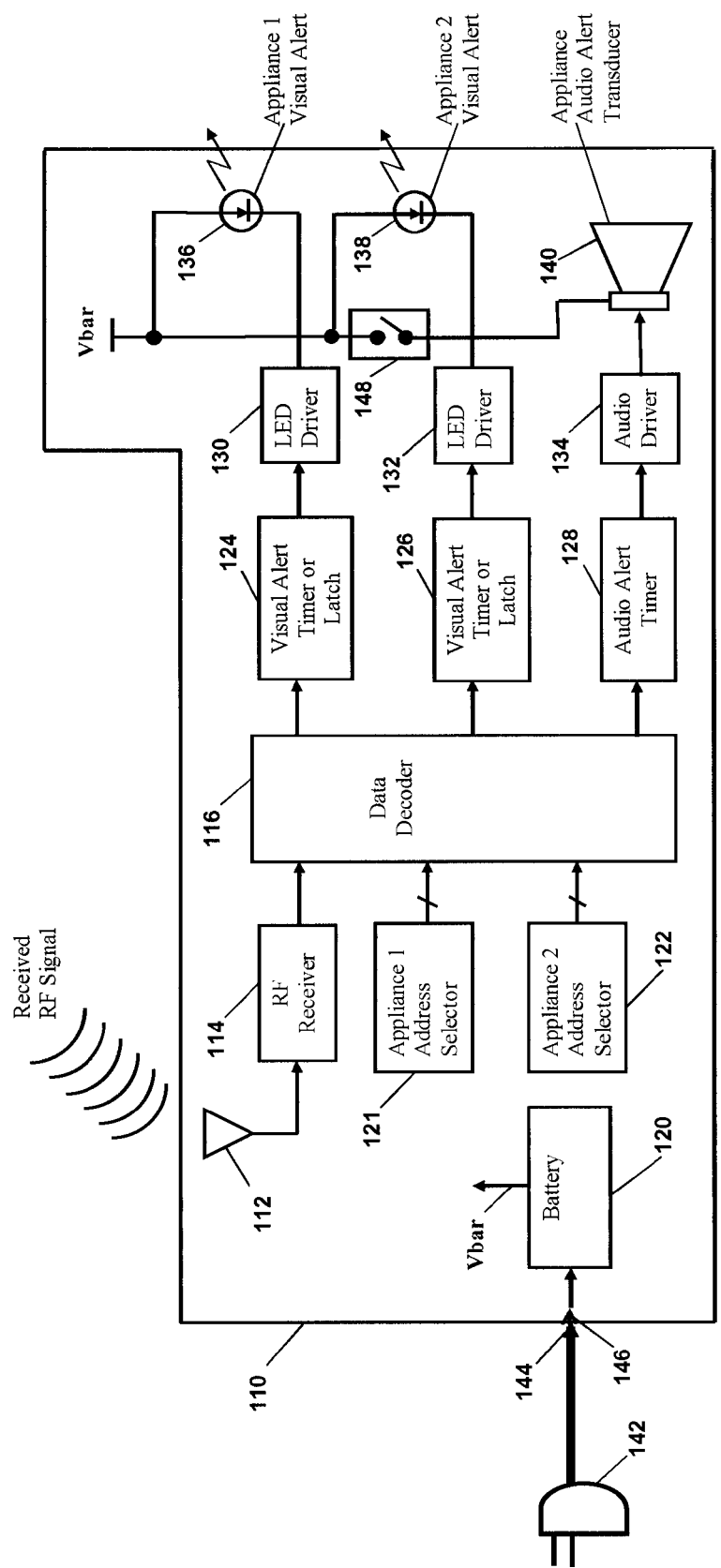
FIG. 7 illustrates a block diagram of an exemplary embodiment of a receiver and alert unit according to the teachings of the present invention.

FIG. 7 is another embodiment of RRAU 110. The difference between the RRAU 110 shown in FIG. 7 and the RRAU 110 shown in FIG. 1, is that additional circuitry has been added to the RRAU 110 in FIG. 7 to support monitoring and alert for a second appliance. To this end, Appliance 2 Address Selector 122 has been added as an input to Data Decoder 116. The visual alert for a second appliance is accomplished by a second visual alert subsystem composed of Visual Alert Timer or Latch 126, LED Driver 132 and Appliance 2 Visual Alert LED 138. The Appliance Audio Alert Transducer 140 and its associated circuitry, Audio Alert Timer 128 and Audio Driver 134, are common to the alerts for Appliance 1 and Appliance 2. Appliance Address Selector 121 and Appliance Address Selector 122 give the user the ability to monitor two different AMTU's, each with its own unique address, using the single RRAU 110 shown in FIG. 7. An example of this would be a user of the invention utilizing a single RRAU 110 to monitor both a washing machine and a dryer.

Figure 8:
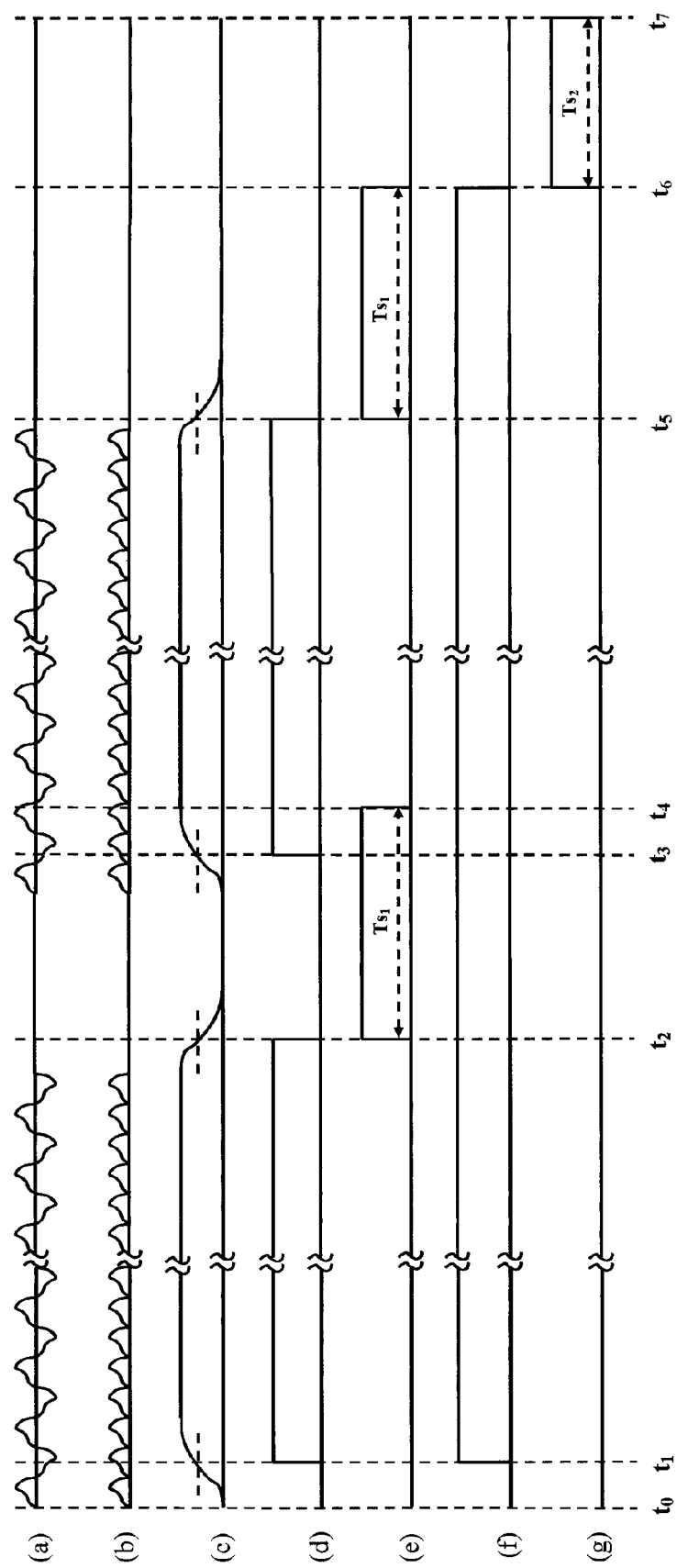
FIG. 8 illustrates a graph depicting the generation and transformation of signals by an exemplary embodiment of a monitor and transmission unit according to the teachings of the present invention.

FIG. 8 is a depiction of the various oscillograms of the signals and timing diagrams for an embodiment of the invention described in FIG. 2. Referring to FIG. 2 and its description will aid in understanding the following description of these oscillograms. First, FIG. 8(a) illustrates the x-axis signal output of Mathematical Integrator 42$x$, which is the signal conditioned x-axis output of the 3-Axis Accelerometer Vibration Sensor 24 shown in FIG. 2. It should be noted that this could also be the output signals of Mathematical Integrator 42$y$ or Mathematical Integrator 42$z$, because they are very similar to the x-axis signal shown. The vibration signal shown in FIG. 8(a) starts at time $t_0$, which is when the Appliance Being Monitored 10 begins its operation. FIG. 8(b) illustrates the output of Rectifier 44$x$ (or, similarly, Rectifier 44$y$ or Rectifier 44$z$), which in this case, is a full wave rectifier. FIG. 8(c) illustrates the output "Vibsig" of Signal Combining Circuit 48, which is the mathematical combination of "Vibx," the output of Low Pass Filter 46$x$, "Viby," the output of Low Pass Filter 46$y$, and "Vibz," the output of Low Pass Filter 46$z$. Signal Combining Circuit 48 performs this mathematical combination using one of two equations, as previously explained in the discussion of FIG. 2. "Vibsig" is sent to the positive input of Comparator 52. FIG. 8(d) illustrates the output of Comparator 52. When "Vibsig," exceeds "Vtrp," which is the negative input of Comparator 52, the output of Comparator 52 goes high at time $t_1$, as shown. The output of Comparator 52 goes to two places: to the input of Retriggerable One-Shot 54 and to one input of OR Gate 56. The output of Retriggerable One-Shot 54 goes to the second input of OR Gate 56. FIG. 8(e) illustrates the output of Retriggerable One-Shot 54 and FIG. 8(f) illustrates the output of OR Gate 56. As can be seen in FIG. 8(f), the output of OR Gate 56 also goes high at time $t_1$, while the output of One Shot 54 remains low, as shown in FIG. 8(e). As long as the Appliance Being Monitored 10 continues to operate, the amplitude of FIG. 8(c) remains above "Vtrp," and the output of Comparator 52 remains high, as shown in FIG. 8(d). If for any reason, such as the temporary interruption of the rotational cycle of the Appliance Being Monitored 10, "Vibsig" drops below "Vtrp," and the output of Comparator 52 drops low at time $t_2$. Retriggerable One-Shot 54 is negative-edge triggered. When the output of Comparator 52 drops low at time $t_2$, One-Shot 54 is triggered high for time period $Ts_1$, and the output of OR Gate 56 remains high. This is to alleviate the problem of short duration drop-outs in the vibration of the Appliance Being Monitored 10. The time period $Ts_1$, which is the output pulse time of One-Shot 54, is selected to be longer than any of these expected temporary short duration drop-outs in vibration. When the Appliance Being Monitored 10 begins its operation again, vibration signals begin again (FIG. 8(a)). The amplitude of "Vibsig" once again increases (FIG. 8(c)), and it exceeds trip point "Vtrp" so that the output of Comparator 52 goes high at time $t_3$, as shown in FIG. 8(d). When One Shot 54 times out, its output goes low at time $t_4$ (FIG. 8(e)), but the output of OR Gate 56 remains high (FIG. 8(f)). The Appliance Being Monitored 10 operates for some further time until it reaches its end-of-cycle, and its vibration permanently stops. The amplitude of "Vibsig" once again decreases (FIG. 8(c)), and it drops below trip point "Vtrp" so that the output of Comparator 52 goes low at time $t_5$, for the last time as shown in FIG. 8(d). One-Shot 54 will re-trigger for fixed duration $Ts_1$ without any further re-triggering. When it times out at time $t_6$, the output of One-Shot 54 will finish at a logic level zero and cause Or Gate 56 to drop to a logic level zero (FIG. 8(f)), which will trigger One-Shot 58, since it is also a negative-edge triggered one-shot. The purpose of the output of One-Shot 58, shown in FIG. 8(g), is to turn on RF Transmitter 64 through Data Encoder 62 only once at the end-of-cycle of the Appliance Being Monitored 10. One-Shot 58 is thus a non-retriggerable one-shot and stays high for time period $Ts_2$. During this time, RF Transmitter 64 is transmitting the End-of-Cycle Alert Code and Address Code information. When One-Shot 58 times out at time $t_7$, the RF transmission ceases and AMTU 20 is ready to monitor another complete operation of the Appliance Being Monitored 10.

A discussion of several alternative methods to be used as the Attachment Apparatus 22 is in order. As previously stated, Attachment Apparatus 22 is used to attach AMTU 20 to the Appliance Being Monitored 10. In all the previously discussed embodiments, a magnet has been used as the Attachment Apparatus 22. In one alternate embodiment, the Attachment Apparatus 22 is a Mechanical Bracket, which is attached to, or an integral part of, AMTU 20. This Mechanical Bracket would then be bolted into a mounting hole that is readily accessible (such as on a faceplate) on Appliance Being Monitored 10, to solidly mount AMTU 20 to the appliance. In another alternate embodiment, AMTU 20 can be mounted anywhere (including non-metallic locations) on the Appliance Being Monitored 10 by making Attachment Apparatus 22 consist of a double-sided adhesive tape that is placed on the underside of AMTU 20. This tape can be of the type that has an adhesive that will allow AMTU 20 to be stuck to one location on Appliance Being Monitored 10, and then subsequently be picked up, moved, and stuck to another location on the appliance (or even another appliance to be monitored) several times, if desired. And finally, in another alternate embodiment, the Attachment Apparatus 22 would consist of several Velcro™ strips. AMTU 20 could be mounted anywhere (including non-metallic locations) on the Appliance Being Monitored 10 by a Velcro™ strip that is placed on the underside of AMTU 20 and stuck to a mating Velcro™ strip attached to the Appliance Being Monitored 10.

A problem with any system that monitors the steady-state mechanical vibration of an appliance or other machine is the exaggerated transient signal generated by Vibration Sensor 24 and subsequently sent through Signal Conditioning Circuitry 30 (both part of AMTU 20) created by an unwanted transitory mechanical "Bang" of the appliance or machine being monitored. This transitory mechanical "Bang" is actually unwanted "noise" for the monitoring system. Note that this problem can occur if Vibration Sensor 24 is either an accelerometer, as in FIG. 2, or a velocity sensor, as in FIG. 3. The amplitude of this transient electrical signal created by the unwanted transitory mechanical "Bang" can easily be 10 to 50 times the amplitude of the normal "steady-state" vibration signal that occurs during the normal "On" operation of the appliance or machine being monitored. If enough of these transitory mechanical "Bangs" (which generate accompanying large transient electrical signals within AMTU 20) occur within a reasonably short period of time, and then suddenly cease to occur, a "false triggering" of the "end of cycle" transmission from AMTU 20 can be initiated.

Figure 9:
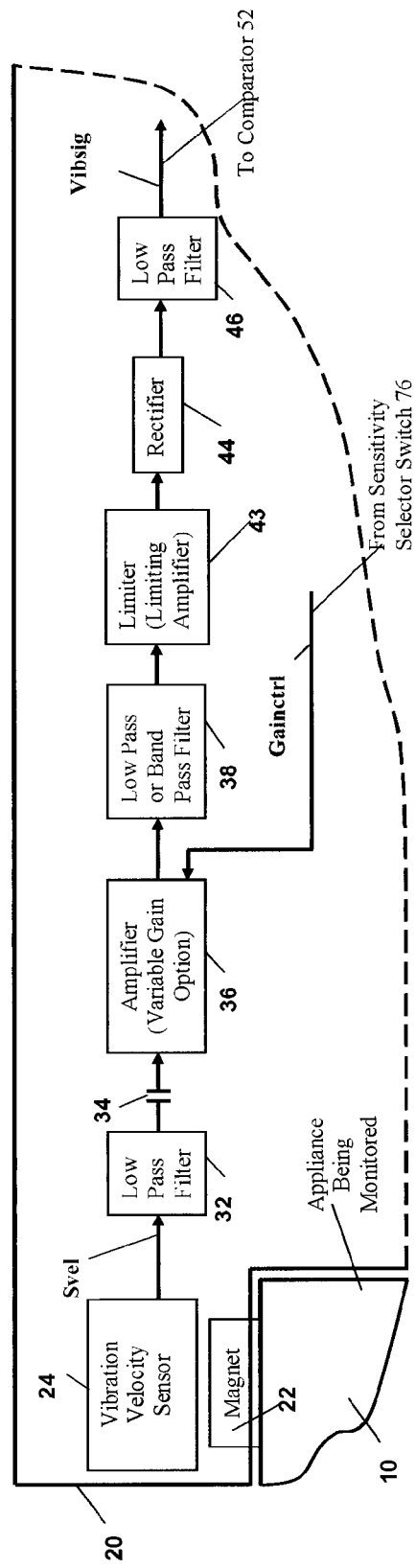
FIG. 9 illustrates a partial view of a block diagram of another exemplary embodiment of a monitor and transmitter unit according to the teachings of the present invention.

In order to reduce the exaggerated response of AMTU 20 to unwanted, transitory mechanical "Bangs," Limiter (Limiting Amplifier) 43 circuit is employed, which can be inserted into the signal conditioning circuitry of AMTU 20 of either FIG. 2 or FIG. 3. For clarity, we have modified FIG. 3 (which uses a velocity sensor as Vibration Sensor 24) to produce FIG. 9, which shows Limiter (Limiting Amplifier) 43 inserted in Signal Conditioning Circuitry 30 between the output of the Signal Conditioning amplifiers and filters and just before Rectifier 44. Note that Limiters 43x, 43y, and 43z could also be inserted in FIG. 2, just before Rectifier 44x, Rectifier 44y, and Rectifier 44z respectively. Another benefit of Limiter (Limiting Amplifier) 43 is to reduce the system's reliance upon the actual amplitude of the "steady-state" vibration of the appliance or machine being monitored, when it is operating in a normal "On" mode. As long as the output of Vibration Sensor 24 and its associated Signal Conditioning amplifiers and filters produce some reasonable signal output amplitude, when the appliance or machine being monitored is "On" and operating normally, AMTU 20 can detect that the appliance or machine is "On." We don't care what the actual amplitude of the "steady-state" vibration is, as long as AMTU 20 can determine that the appliance or machine is "On" or "Off." This means we may need fewer sensitivity ranges for Sensitivity Selector Switch 76.

Figure 10:
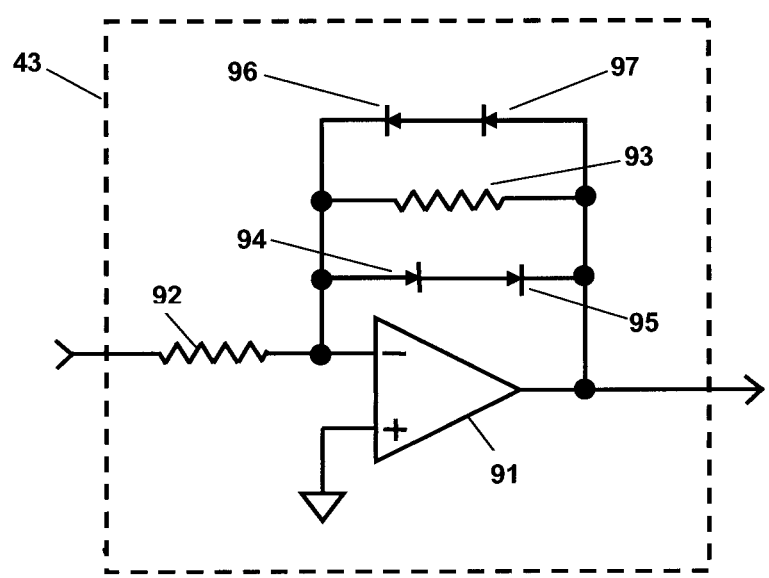
FIG. 10 illustrates a block diagram of an exemplary limiter according to the teachings of the present invention.

FIG. 10 shows one simple, straightforward embodiment of Limiter (Limiting Amplifier) 43. This, of course, does not preclude many other methods of implementing such a Limiter. This embodiment consists of Operational Amplifier 191, an input Resistor 192 (also called $R_{in}$), and a feedback network consisting of Resistor 193 (also called $R_f$), Diode 194, Diode 195, Diode 196, and Diode 197. Note that all four diodes are simple small signal diodes (such as 1N4148 or 1N914 diodes) with a forward diode voltage drop (called $V_d$) of about 0.6 Volts each. When they are reverse biased, they are off, with an extremely high resistive impedance, and no current flows through them, except an extremely small leakage current in the range of nanoamps ($10^{-9}$ amps) or less. The input voltage signal to this circuit (called $V_{in}$) comes from the output voltage signal of Vibration Sensor 24 and its associated Signal Conditioning amplifiers and filters. The output voltage signal (called $V_{out}$) of this circuit goes to Rectifier 44.

Figure 11:
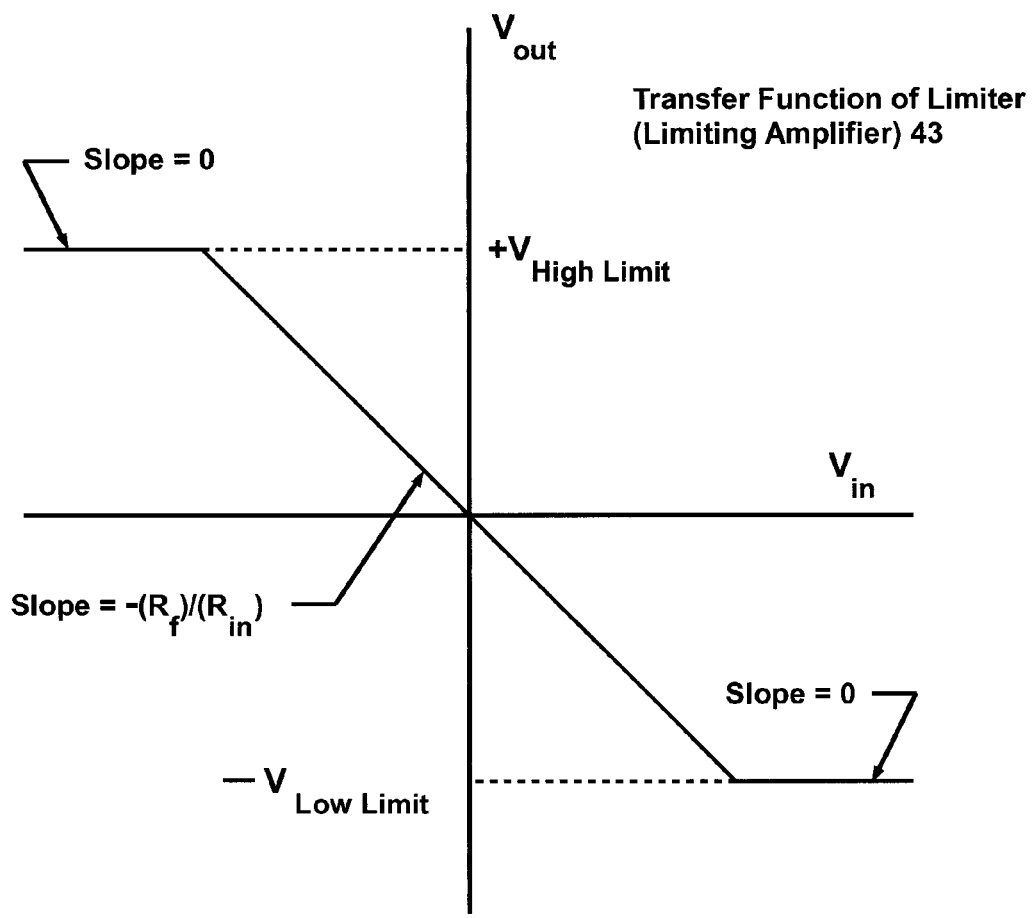
FIG. 11 illustrates a graph depicting a transfer function of an exemplary limiter according to the teachings of the present invention.

A discussion of the operation of this embodiment of Limiter (Limiting Amplifier) 43 will now be presented. For clarity, the transfer function of the circuit is shown in FIG. 11. First, we will assume that the operation of Operational Amplifier 191 is very close to that of an ideal Operational Amplifier (otherwise called an Op Amp). This means that the voltage difference between the inverting (−) input and the non-inverting (+) input of the Op Amp is essentially zero Volts. Also, the impedance looking into these two inputs is essentially infinite (very, very high) and no current flows into or from them. In a real world Op Amp, very small bias currents and very small offset voltages occur, but they are so small we shall ignore them here. Since the non-inverting (+) input of the Op Amp is connected to ground (0 Volts), then, due to the ideal operation of the Op Amp, the inverting (−) input is also at 0 Volts. This means that the voltage across the feedback network, consisting of Diodes 194, 195, 196, and 197 and Resistor 193, is simply the output of Operational Amplifier 191, which is also just the output voltage signal, $V_{out}$, of the Limiter (Limiting Amplifier) 43. When this output signal, $V_{out}$, falls between +1.2 Volts and −1.2 Volts (approximately), Diodes 194, 195, 196, and 197 are off, since they are either back-biased or there is not enough forward voltage from $V_{out}$ to turn them on. This means that Diodes 194, 195, 196, and 197 are essentially out of the circuit, and the circuit becomes a simple linear inverting amplifier with a gain of $(-R_f/R_{in})$, or:

$$V_{out} = (-R_f/R_{in}) * V_{in},$$

as is shown in FIG. 11.

When the equation for $V_{out}$ (just shown above) would normally produce an output voltage $V_{out}$ greater than +1.2 Volts, Diodes 96 and 97 turn on (while Diodes 194 and 195 remain off, since they are back biased) and limit output voltage $V_{out}$ from going any higher than +1.2 Volts, which is the sum of the forward voltage drops of Diodes 196 and 197. When the equation for $V_{out}$ (shown above) would normally produce an output voltage $V_{out}$ less than −1.2 Volts, Diodes 194 and 195 turn on (while Diodes 196 and 197 remain off, since they are back biased) and limit output voltage $V_{out}$ from going any lower than −1.2 Volts, which is the sum of the forward voltage drops of Diodes 194 and 195. It must be pointed out that this design does not preclude the use of zener diodes for Diodes 194 and 196, or preclude the omission of Diodes 194 and 196 (and replace them with 0 ohm jumpers) so as to produce different high and low limit voltages, other than +1.2 Volts and −1.2 Volts. The "limited" $V_{in}$ to $V_{out}$ relationship is clearly shown in FIG. 11 and shows generally defined $V_{HighLimit}$ and $V_{LowLimit}$ values. In the particular embodiment we have been discussing here, $V_{HighLimit}$ equals +1.2 Volts and $V_{LowLimit}$ equals −1.2 Volts.

Figure 12:
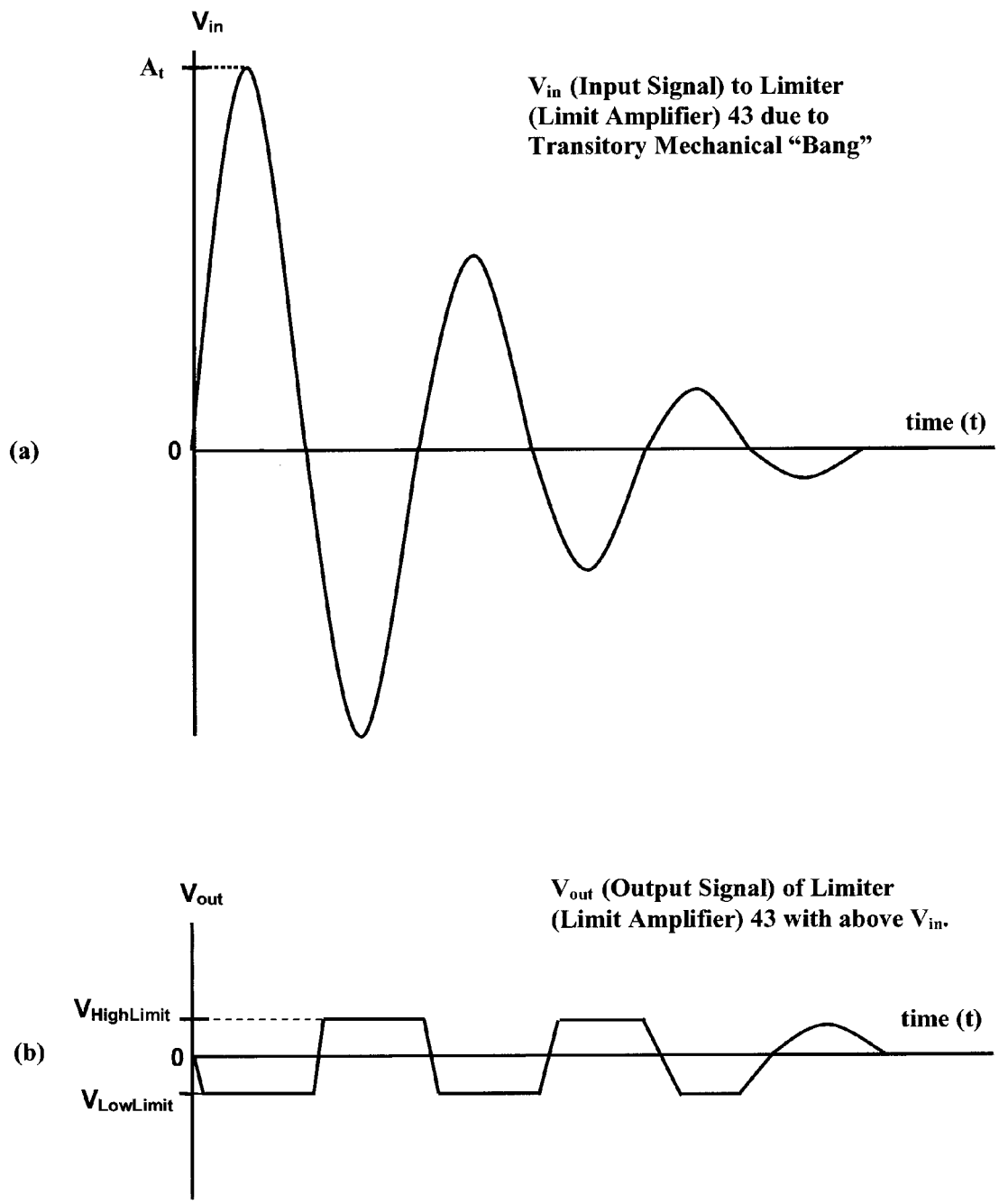
FIG. 12 illustrates a graph depicting functions of an exemplary limiter according to the teachings of the present invention.

FIG. 12 shows how the operation of Limiter (Limiting Amplifier) 43 greatly reduces the amplitude of these unwanted "noise" signals. FIG. 12(a) shows an input signal, $V_{in}$, to Limiter 43 created by a transient mechanical "Bang" of the appliance or machine being monitored, which comes from Vibration Sensor 24 through its accompanying Signal Conditioning Amplifier and Filtering Circuitry. As stated before, the maximum amplitude $A_t$ of this transient signal may be 10 to 50 times the normal amplitude of the "steady-state" vibration of the appliance or machine being monitored, when it is "on" and running normally. The transient signal does eventually decay due to the inherent mechanical dampening factor of the appliance or machine being monitored. FIG. 12(b) shows the output signal of Limiter 43. It clearly shows that Limiter 43 greatly reduces or "limits" the amplitude of this unwanted signal. It, therefore, greatly reduces the effect of this unwanted "noise" on the moving average of the magnitude of the appliance's vibration, created by Rectifier 44 and Low Pass Filter 46. And, thus, it greatly reduces the chance of a "false triggering" of an "end of cycle" transmission from AMTU 20.

Figure 13:
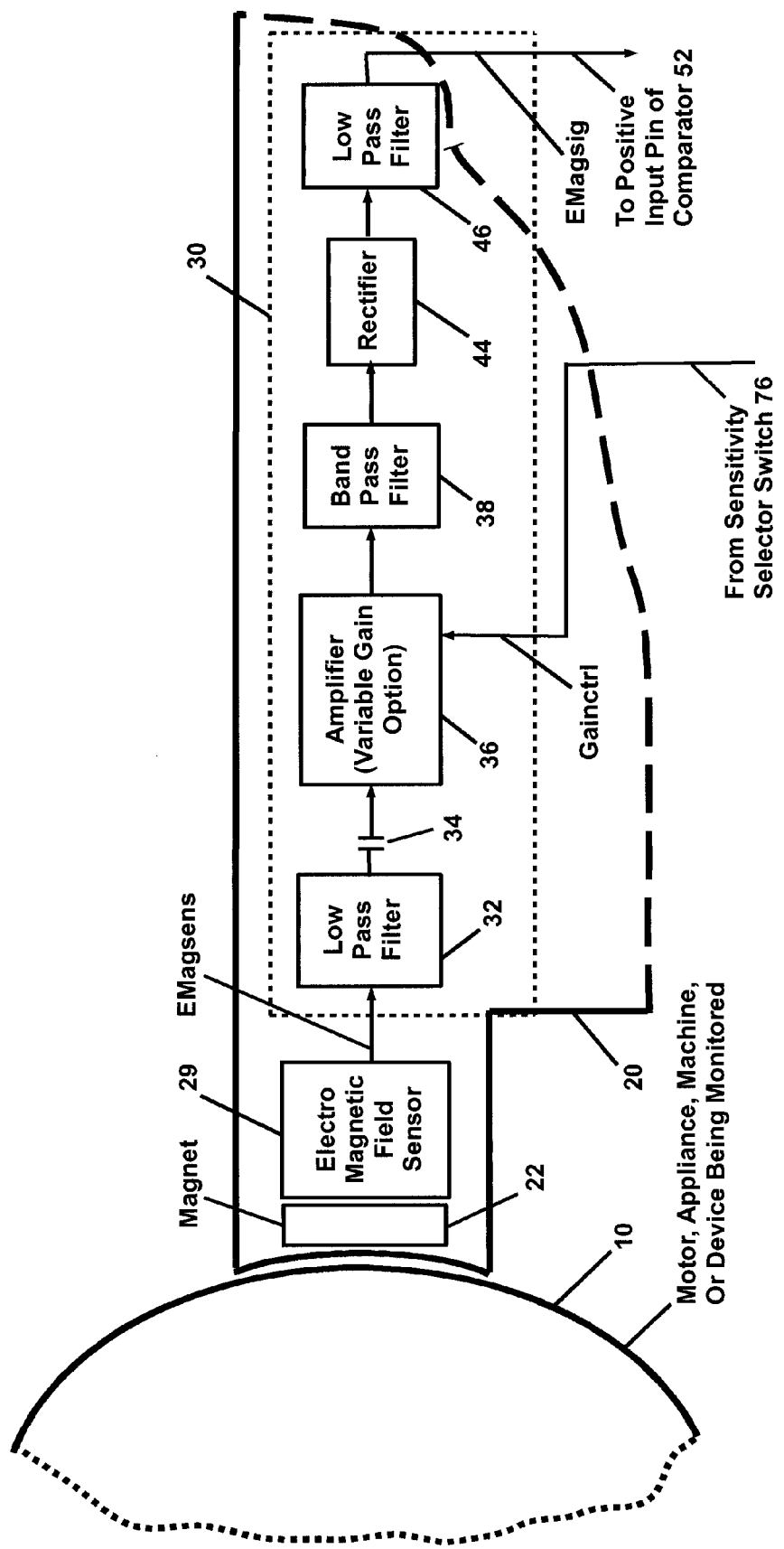
FIG. 13 is a block diagram of the electrical schematic drawing of the electronic system included in the Appliance Monitor and Transmitter Unit 20 (AMTU 20) of another embodiment of the invention.

FIG. 13 is a block diagram of the electrical schematic drawing of the electronic system included in the Appliance Monitor and Transmitter Unit 20 (AMTU 20) of another embodiment of the invention. In this embodiment, the operational state sensor comprises an Electromagnetic Field Sensor 29 to determine when the Appliance, Machine, or Device Being Monitored 10 is in operation, instead of using the Accelerometer Vibration Sensor 24 described in FIG. 2, the Velocity Vibration Sensor 24 described in FIG. 3, the Audio Microphone Sensor 28 described in FIG. 5, or the Magnetic Field Sensor 26 described in FIG. 4. Please note that Electromagnetic Field Sensor 29 monitors an entirely different electromagnetic field than Magnetic Field Sensor 26 described in FIG. 4. Magnetic Field Sensor 26 measures the amplitude of the magnetic field surrounding the Power Cord 12 that supplies the electrical power to the Appliance, Machine, or Device Being Monitored 10, which is directly related to the amplitude of the electrical current being drawn by the Appliance, Machine, or Device Being Monitored 10. It uses a Magnetic Field Sensing Ring 25 that surrounds Power Cord 12 that concentrates the magnetic field of the power cord for Magnetic Field Sensor 26. Electromagnetic Field Sensor 29, on the other hand, monitors the inherent electromagnetic field that actually is created by, emanates from, and surrounds the Appliance, Machine, or Device Being Monitored 10. This field can be created by an electric motor, an electrical transformer, an electrical generator, an electrical pump, or the electrical power supply, either internal to or external to, of any electrical or electronic device that is to be monitored. This sensor can be attached, either temporarily or permanently, to the shell, housing, or enclosure of the Appliance, Machine, or Device Being Monitored 10. Electromagnetic Field Sensor 29 requires no wiring or electrical connection to the power source of the Appliance, Machine, or Device Being Monitored 10, and, thus, maintains a high degree of safety for any user of this monitoring system. Electromagnetic Field Sensor 29 could either be a Hall-Effect sensor, an inductive coil similar to a telephone pickup coil, or some other type of electromagnetic field sensor. The output of Electromagnetic Field Sensor 29 is "EMagsens" and is sent through Low Pass Filter 32 and DC Blocking Capacitor 34 to variable gain Amplifier 36. The gain of Amplifier 36 is controlled by signal "Gainctrl", which comes from Sensitivity Selector Switch 76 and is derived by Gain Range Select circuit 74 as detailed in the description for FIG. 2. The output of Amplifier 36 is sent through Band Pass Filter 38, which is centered at the frequency of the most pronounced electromagnetic field emanating from the Appliance, Machine, or Device Being Monitored 10. This frequency often could be 60 Hz, but it could also be 50 Hz, as is common in Europe, or perhaps 440 Hz, as is common in aircraft electrical systems, and any other alternating current frequency that is the most pronounced emanating from the Appliance, Machine, or Device Being Monitored 10. The gain ranges of Amplifier 36 are optimized for the Electromagnetic Field Sensor's signal. Rectifier 44 and Low Pass filter 46 both act exactly as those shown in FIG. 2. The output "EMagsig", of Low Pass filter 46 goes to the positive input of Comparator 52. All of the remaining circuitry of the AMTU 20 for this embodiment of the invention, which is not shown in FIG. 13, acts exactly as detailed in the description of the embodiment of FIG. 2.

Figure 14:
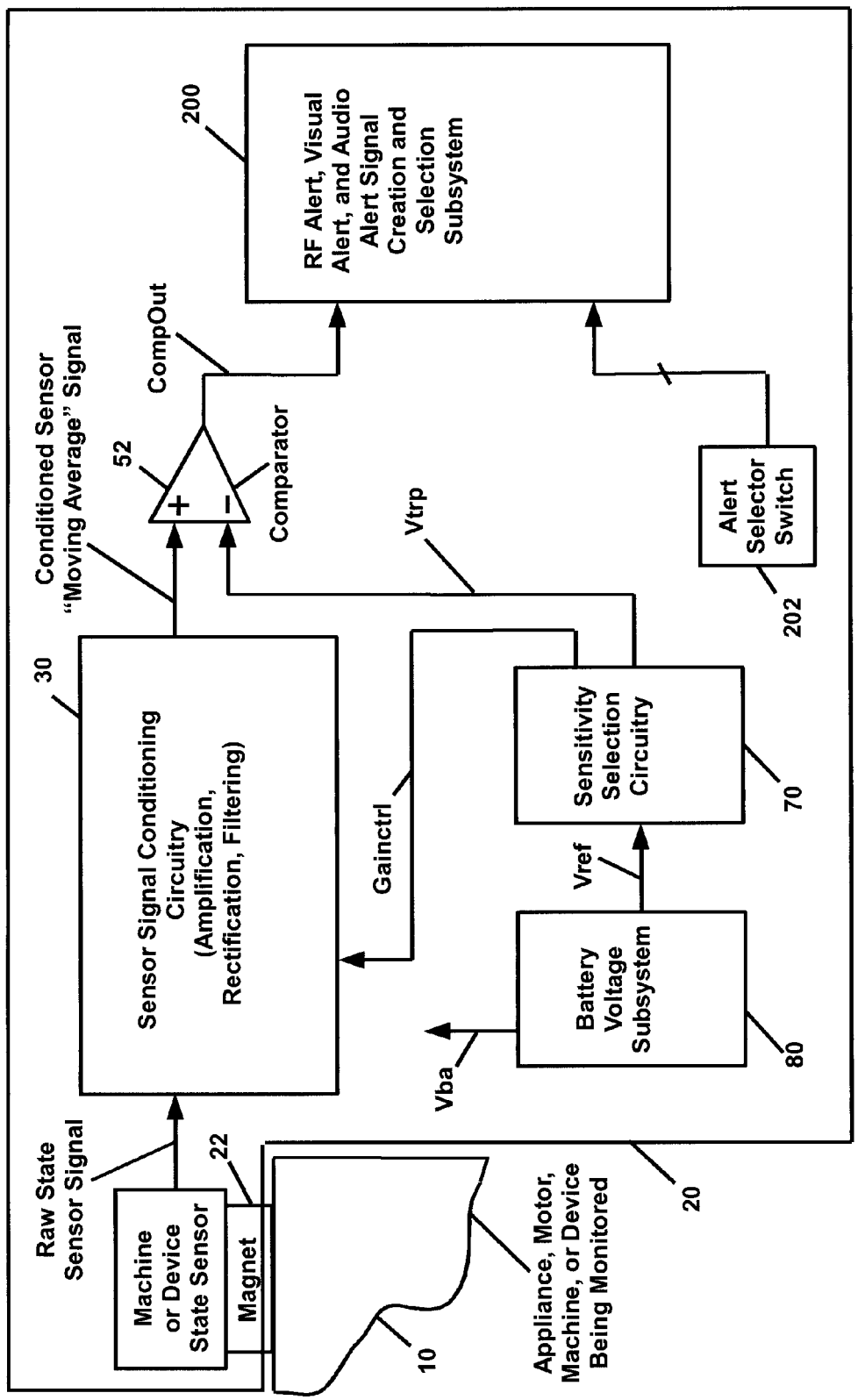
FIG. 14 is a block diagram of the electrical/electronic system included in the Machine or Device Monitor and Alert Unit 20 (MDMAU 20) of a general embodiment of the invention that represents several embodiments of the invention.

FIG. 14 is a block diagram of the electrical/electronic system included in the Machine or Device Monitor and Alert Unit 20 (MDMAU 20) of a general embodiment of the invention that represents several embodiments of the invention. Note: in FIG. 14, we have defined a new, more general term for the previously used term Appliance Monitor and Transmitter Unit 20 (AMTU 20), in order to broaden the scope of the devices to be monitored and to broaden the types of monitoring units to include those which are "stand alone" alert units, and do not necessarily transmit an RF alert signal to a remote RF receiving and alert unit. This new term is "Machine or Device Monitor and Alert Unit 20" or, in its shorter version, the MDMAU 20. Also, in FIG. 14, we have defined a new, more general term for all the previously named "Appliance Cycle Sensors," in order to broaden the application for such sensors. The new term is "Machine or Device State Sensor" and applies to all previously described Appliance Cycle Sensors. A Machine or Device State Sensor uses one of several methods, previously discussed and reiterated below, to produce an electrical signal that follows the operational state of the machine or device being monitored, and can be used to determine when that device is in the "On" state, in the "Off" state, or making the transition from one of these states to the other. FIG. 14 is a general block diagram of an embodiment that is representative of any one of the five previously described embodiments, where each embodiment uniquely uses: (1) one of the five previously described Machine or Device State Sensors (formerly named Appliance Cycle Sensors) chosen to monitor an Appliance, Motor, Machine, or Device, and (2) the appropriate Sensor Signal Conditioning Circuitry 30 required for that particular sensor. Specifically, FIG. 14 may represent an embodiment that uses: (1) a small, 3-axis accelerometer Vibration Sensor 24, and its accompanying Sensor Signal Conditioning Circuitry 30, as described in FIG. 2, or (2) a single axis velocity sensor Vibration Sensor 24, and its accompanying Sensor Signal Conditioning Circuitry 30, as described in FIG. 3, or (3) a Magnetic Field Sensor 26 (surrounding a power cord), and its accompanying Sensor Signal Conditioning Circuitry 30, as described in FIG. 4, or (4) an Audio Microphone Sensor 28, and its accompanying Sensor Signal Conditioning Circuitry 30, as described in FIG. 5, or (5) an Electromagnetic Field Sensor 29, and its accompanying Sensor Signal Conditioning Circuitry 30, as described in FIG. 13.

In this embodiment, as shown in FIG. 14, the self-contained MDMAU 20 includes Attachment Apparatus 22 (which is a magnet in this embodiment), a Machine or Device State Sensor selected from the five types listed above, the appropriate Sensor Signal Conditioning Circuitry 30 for that sensor, Sensitivity Selection Circuitry 70, Battery Voltage Subsystem 80, Address Selector 68, Comparator 52, Alert Selector Switch 202, and RF Alert, Visual Alert, and Audio Alert Signal Creation and Selection Subsystem 200. MDMAU 20 is attached by the user to any metallic (ferromagnetic material) location on the Machine, Motor, Appliance, or Device Being Monitored 10 using the magnetic force from Attachment Apparatus Magnet 22. The Machine or Device State Sensor sends its raw output sensor signal to the Sensor Signal Conditioning Circuitry 30 appropriate for that sensor. Sensor Signal Conditioning Circuitry 30 amplifies, filters, rectifies, and again filters the sensor signal to produce a conditioned "Moving Average" analog voltage sensor signal that follows the operational state of the Appliance, Motor, Machine, or Device Being Monitored 10. This moving average operational signal is then sent to the positive input of Comparator 52. In this embodiment, Sensor Signal Conditioning Circuitry 30 contains a Variable Gain Amplifier 36 to help optimize the sensitivity of MDMAU 20. The Amplifier Gain is selected using the gain control signal "Gainctrl" produced by Sensitivity Selection Circuitry 70, described below.

Battery Voltage Subsystem 80, is exactly as described in FIG. 2. [It consists of Battery 82, Voltage Reference 84, Low Battery Voltage Detector 86, and Low Battery Voltage LED 88.] Battery Voltage Subsystem 80 provides voltage "Vba" to all the electronic components of the MDMAU 20. Using the precise Voltage Reference 84 that it contains, Battery Voltage Subsystem 80 also creates a very stable Reference Voltage "Vref," that is sent to Sensitivity Selection Circuitry 70.

Sensitivity Selection Circuitry 70, is exactly as described in FIG. 2. [It contains resistive Voltage Divider Circuit 72, Gain Range Select Circuit 74, and Sensitivity Selector Switch 76.] The purpose of Sensitivity Selection Circuitry 70 is: (1) to develop the correct "trip-point" reference voltage "Vtrp" to be sent to Comparator 52, and (2) to develop the correct gain control signal "Gainctrl" to be sent to the Variable Gain Amplifier 36 contained in Sensor Signal Conditioning Circuitry 30. The sensitivity range needed for a particular MDMAU 20 depends upon the general amplitude level of the raw sensor signal output coming from the particular Machine or Device State Sensor being used in the MDMAU 20. In this embodiment, as in the embodiment of FIG. 2, there are three sensitivity ranges: (1) a "Low" sensitivity range, (2) a "Normal" sensitivity range, and (3) a "High" sensitivity range. The user of the MDMAU 20 may select any of the three sensitivity ranges using Sensitivity Selector Switch 76. For each of the three sensitivity ranges there is a corresponding "trip-point" reference voltage, "Vtrp," and a corresponding "Gainctrl" gain control signal, which will have been determined through empirical testing. Once the sensitivity range has been selected by the operator using Sensitivity Selector Switch 76, the switch then sends the correct "trip-point" reference voltage, "Vtrp," to the negative input of Comparator 52, and the correct "Gainctrl" gain control signal to Variable Gain Amplifier 36 to provide the correct gain for the MDMAU 20.

A discussion of Comparator 52 is now in order. As previously stated, the output of Sensor Signal Conditioning Circuitry 30 is a conditioned "Moving Average" analog voltage sensor signal that follows the operational state of the Appliance, Motor, Machine, or Device Being Monitored 10. It is sent to the positive input of Comparator 52. The negative input of Comparator 52 is connected to a "trip-point" reference voltage, "Vtrp," which was created by Sensitivity Selection Circuitry 70, as previously described. In this embodiment, "Vtrp" will consist of one of three values depending upon the sensitivity range selected by the user of the MDMAU 20. The purpose of Comparator 52 is to trip "High" when the amplitude of the conditioned "Moving Average" sensor signal is above the "Vtrp" value selected. This indicates the Appliance, Motor, Machine, or Device Being Monitored 10 is operating (or is in the "On" state). When the amplitude of the conditioned "Moving Average" sensor signal falls below the "Vtrp" value selected, Comparator 52 trips "Low" This indicates the Appliance, Motor, Machine, or Device Being Monitored 10 is not operating (or in the "Off" state.) [Typically, in order to reduce the possibility of false triggering, Comparator 52 is given a small amount of hysteresis, produced by using a small amount of positive feedback (not shown in FIG. 14) around Comparator 52.] Thus, the digital output signal of Comparator 52, named "CompOut," indicates whether the Appliance, Motor, Machine, or Device Being Monitored 10 is in the "On" or "Off" state in real time. The "CompOut" signal from Comparator 52 is sent to RF Alert, Visual Alert, and Audio Alert Signal Creation and Selection Subsystem 200. The remaining inputs to the RF Alert, Visual Alert, and Audio Alert Signal Creation and Selection Subsystem 200 are those developed by Alert Selector Switch 202. The user of the MDMAU 20 may select which Alert Signals, i.e., RF Alert, Visual Alert, and/or Audio Alert Signals, may be produced by the MDMAU 20 and whether they will occur once, or on a periodically repetitive basis, or on a continuous basis. The description and operation of the RF Alert, Visual Alert, and Audio Alert Signal Creation and Selection Subsystem 200 are shown in much greater detail in FIG. 15 and its associated descriptive material.

Figure 15:
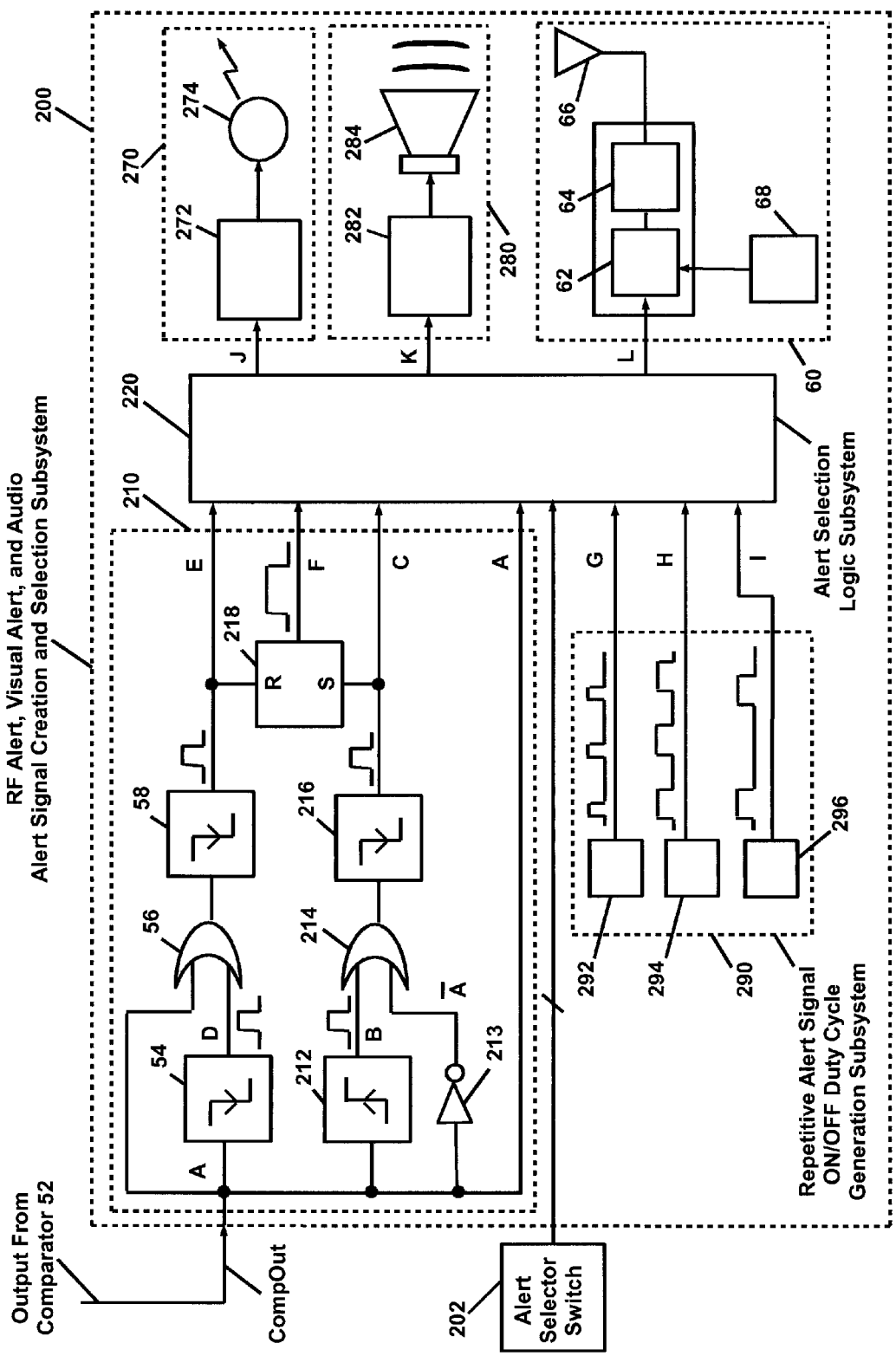
FIG. 15 is the electrical schematic drawing, in block diagram format, of a portion of the electronic system included in the Machine or Device Monitor and Alert Unit 20 (MDMAU 20) of the general embodiment of the invention shown in FIG. 14.

FIG. 15 is the electrical schematic drawing, in block diagram format, of a portion of the electronic system included in the Machine or Device Monitor and Alert Unit 20 (MDMAU 20) of the general embodiment of the invention shown in FIG. 14. In particular, FIG. 15 details the components contained within the RF Alert, Visual Alert, and Audio Alert Signal Creation and Selection Subsystem 200 and shows that only two inputs are required by Subsystem 200, although one of the inputs actually consists of multiple switch signals. These inputs are: (1) the single output signal from Comparator 52, CompOut, and (2) the multiple switch signals produced by Alert Selector Switch 202, which are selected at the discretion of the user of the Machine or Device Monitor and Alert Unit 20. With regard to Alert Selector Switch 202, it is important that several terms be defined now.

First, the term "Alert Condition" is defined here. This term has to deal with three conditions (or states) that occur as parts of the operational state signal of the Appliance, Motor, Machine, or Device Being Monitored 10. [The operational state signal comes from the Machine or Device Sensor that is attached to the Appliance, Motor, Machine, or Device Being Monitored 10 and is put through the Sensor Signal Conditioning Circuitry 30.] These conditions (or states) can be detected by the Machine or Device Monitor and Alert Unit 20 (MDMAU 20), and the MDMAU 20 can provide some kind of alert, when the conditions are detected, if the user so desires. The three "Alert Conditions" (or states) are: (1) the Power-Up Transition State, (2) the Power-On Steady State, and (3) the Power-Down Transition State. The Power-Up Transition State occurs when the Appliance, Motor, Machine, or Device Being Monitored 10 makes the transition from the "Off" state to the "On" state and stays "On" for some reasonable period of time, called Tos1 in FIG. 16. The Power-On Steady State is rather self explanatory and occurs when the Appliance, Motor, Machine, or Device Being Monitored 10 stays continuously "On" (otherwise known as the "steady state") beyond time period Tos1 and lasts until the The Power-Down Transition State occurs. The Power-Down Transition State occurs when the Appliance, Motor, Machine, or Device Being Monitored 10 makes the transition from the "On" state to the "Off" state and stays "Off" for some reasonable period of time, called Tos3 in FIG. 16. Note that by using the delay times Tos1, for the Power-Up Transition State, and Tos3, for the Power-Down Transition State, an attempt is being made to prevent the false detection of these conditions and the false triggering of their associated Alerts. We want to make sure that the Appliance, Motor, Machine, or Device Being Monitored 10 has truly reached the "On" state, in the case of Tos1, or truly reached the "Off" state, in the case of Tos3. For example, the Appliance, Motor, Machine, or Device Being Monitored 10 may be "On," but may cut out, or turn "Off" briefly, due to: (1) temporary "glitches" in the power supplied by the Utility Company, or (2) a brief programmed "Off" time in the operational cycle of the Device Being Monitored 10 itself, or (3) some other cause of temporary extraneous "On"/"Off" fluctuations in the Device's power supply. By using the delay time, Tos3, an attempt has been made to eliminate these brief noise "glitches," or temporary extraneous "On"/"Off" fluctuations, and to eliminate a false Power-Down Transition State Alert by making sure that the Appliance, Motor, Machine, or Device Being Monitored 10 has remained in the "Off" state for at least time Tos3, before producing an Alert signal. Note that optimum time periods for time delays Tos1 and Tos3 will most likely be derived empirically by testing, and they may not necessarily be of the same duration. Also, either Tos1 or Tos3, or both, could be made zero, and, for those cases, no attempt to eliminate false Alerts would be made.

Secondly, the term "Alert Type" is defined here. This term has to do with the devices or means that the Machine or Device Monitor and Alert Unit 20 (MDMAU 20) can employ to alert the user when any one (or more) of the "Alert Conditions," described above, has been detected by the MDMAU 20. The three "Alert Types" are: (1) a Visual Alert signal, (2) an Audio Alert signal, or (3) an RF Alert signal. The user of the MDMAU 20 may select which of the types of Alert Signals may be produced by the MDMAU 20. A Visual Alert signal could be the light signal produced by an LED or an incandescent light bulb. An Audio Alert signal could be the sound from an electromechanical buzzer or other sound transducer. An RF Alert signal could be the Radio Frequency (RF) transmissions sent out by the MDMAU 20, that might be encoded digitally using the same OOK (On/Off Keying) AM radio transmission method used by some automobile Remote Key-less Entry RF systems.

And lastly, the term "Alert Method" is defined here. This term has to do with how often the "Alert Types," described above, will produce alert signals, once any one (or more) of the "Alert Conditions," previously described, has been detected by the MDMAU 20. The three "Alert Methods" are: (1) a single pulse (or one-shot) alert signal, (2) a continuously operated alert signal, or (3) a repetitive alert signal that repeats at some predefined frequency with some predefined "On"/"Off" duty cycle. Any one of the "Alert Methods" can be applied to any one, two, or three of the "Alert Types," when any one of the three "Alert Conditions" has been detected by the MDMAU 20, although, as a practical matter, the single pulse alert signal would most likely not be an appropriate alert signal when the Power-On Steady State "Alert Condition" has been detected.

Alert Selector Switch 202, which actually can be made up of several switches, allows the user of the Machine or Device Monitor and Alert Unit 20 (MDMAU 20) to select, at his discretion, which of the "Alert Conditions," "Alert Types," and "Alert Methods," just described, will be used during the operation of the MDMAU 20. A more detailed description of the makeup of Alert Selector Switch 202 and a discussion of its operation and signal outputs will be given in FIG. 17 and its associated descriptive material.

A description of the components and operation of RF Alert, Visual Alert, and Audio Alert Signal Creation and Selection Subsystem 200 and its inputs will be given now. As seen in FIG. 15, RF Alert, Visual Alert, and Audio Alert Signal Creation and Selection Subsystem 200 contains Alert Condition Detection and False Alert Reduction Subsystem 210, Alert Selection Logic Subsystem 220, Visual Alert Subsystem 270, Audio Alert Subsystem 280, RF Alert Subsystem 60, and Repetitive Alert Signal ON/OFF Duty Cycle Generation Subsystem 290. The two inputs to Subsystem 200 were already detailed in the opening paragraph of the discussion of FIG. 15. The first purpose of Subsystem 200 is to use the input signal "CompOut," which is the digital output signal from Comparator 52, to detect the occurrence of the previously defined "Alert Conditions," while eliminating as many false detections of "Alert Conditions" as possible. The second purpose of Subsystem 200 is to use the signals from Alert Selector Switch 202, that have been chosen by the user of the MDMAU 20, to produce alert signals from the selected "Alert Type(s)" using the selected "Alert Method(s)," whenever the selected "Alert Condition(s)" have been detected.

We will now explain the components and operation of the Alert Condition Detection and False Alert Reduction Subsystem 210. Subsystem 210 consists of Retriggerable One-Shot 54, OR Gate 56, Nonretriggerable One-Shot 58, Retriggerable One-Shot 212, Inverter 213, OR Gate 214, Nonretriggerable One-Shot 216, and RS Flip-Flop 218, as shown in FIG. 15. One-Shots 54, 58, and 216 are negative-edge triggered One-Shots, which means when the input to such a One-Shot makes the transition from High to Low, it is triggered to produce an output pulse which remains High for some predefined period of time, specifically selected for that One-Shot, until it goes Low, or "times-out." [This is often called the One-Shot's timing cycle.] One-Shot 212 is a positive-edge triggered One-Shot, which means when the input to such a One-Shot makes the transition from Low to High, it is triggered to produce an output pulse which remains High for some predefined period of time, specifically selected for that One-Shot, until it goes Low, or "times-out." Explanations of a "Retriggerable" One-Shot and a "Nonretriggerable" One-Shot are required here. Once a Nonretriggerable One-Shot has been triggered, it ignores additional input trigger transitions while the output pulse is still High and the One-Shot has not "timed-out" yet. However, once a Retriggerable One-Shot has been triggered, it does not ignore additional input trigger transitions. It will begin a new timing cycle every time an additional input trigger transition occurs, while the One-Shot's output pulse is still High and the One-Shot has not "timed-out" yet.

The purposes of Subsystem 210 are actually contained within its name. First, it detects the three "Alert Conditions" described above and also creates the time delays Tos1 and Tos3 that, in conjunction with other circuitry, help reduce the chances of triggering false alerts by the Machine or Device Monitor and Alert Unit 20 (MDMAU 20), as previously explained. The input to Alert Condition Detection and False Alert Reduction Subsystem 210 is the output of Comparator 52, CompOut, which indicates whether, in real time, the Appliance, Motor, Machine, or Device Being Monitored 10 is in the "On" state (CompOut is High), or the "Off" state (CompOut is Low), or is changing states. [CompOut is also called Signal A and is additionally sent to Alert Selection Logic Subsystem 220 for possible use in that Subsystem.]

Retriggerable One-Shot 212, Inverter 213, OR Gate 214, and Nonretriggerable One-Shot 216 combine to detect the Power-Up Transition State "Alert Condition," as described here. CompOut (or Signal A) is sent to the input of Retriggerable One-Shot 212, which is positive-edge triggered, and to the input of Inverter 213. The output of Inverter 213 is sent to one input of OR Gate 214. The output of Retriggerable One-Shot 212 goes to the second input of OR Gate 214. The output of OR Gate 214 is sent to the input of Nonretriggerable One-Shot 216, which is negative-edge triggered. As long as the Appliance, Motor, Machine, or Device Being Monitored 10 is "Off," CompOut (or Signal A) remains Low and the output of Inverter 213 remains High. The output of Retriggerable One-Shot 212 (Signal B) is Low, since it hasn't been triggered yet. Because one of the inputs to OR Gate 214 is High, its output is High. When the Appliance, Motor, Machine, or Device Being Monitored 10 begins to turn "On," CompOut goes from Low to High, which triggers Retriggerable One-Shot 212 and its output goes High, while the output of Inverter 213 goes Low. Since one of the inputs to OR Gate 214 is still High, its output remains High. Before Retriggerable One-Shot 212 "times-out," the Appliance, Motor, Machine, or Device Being Monitored 10 may briefly turn "Off" to "On" to "Off" several times before it turns "On" for good. Each "Off" to "On" transition of the Device Being Monitored 10 produces a Low to High transition in CompOut, which retriggers One-Shot 212 and keeps its output, as well as the output of OR Gate 214, High. When the Device Being Monitored 10 turns "On" for good, it produces a final Low to High transition in CompOut and the output of Inverter 213 (one of the inputs to OR Gate 214) goes Low. This final Low to High transition retriggers, for a final time, One-Shot 212, whose output has been High and continues to remain High until it "times-out" after a fixed time duration, Tos1. The One-Shot's output, as well as the output of OR Gate 214, will then drop from High to Low. This will trigger negative-edge triggered Nonretriggerable One-Shot 216 to produce an output pulse that will remain High for a fixed time, Tos2. This output pulse from One-Shot 216 is the Power-Up Transition State Detection Pulse, also called Signal C, and indicates that the Power-Up Transition State has been detected. It is sent to the Alert Selection Logic Subsystem 220 and to the "Set" input of RS Flip-Flop 218, whose output then goes from Low to High. The output of RS Flip-Flop 218 is the Power-On Steady State Signal, also called Signal F, and when it goes from Low to High, it indicates that the Appliance, Motor, Machine, or Device Being Monitored 10 is in the Power-On Steady State Condition. It will stay High while the Device Being Monitored 10 remains "On" in the Power-On Steady State Condition, until the Power-Down Transition State is detected, as explained below.

Retriggerable One-Shot 54, OR Gate 56, and Non-retriggerable One-Shot 58 combine to detect the Power-Down Transition State "Alert Condition," as described here. CompOut (or Signal A) is sent to the input of Retriggerable One-Shot 54, which is negative-edge triggered, and to one input of OR Gate 56. The output of Retriggerable One-Shot 54 (Signal D) goes to the second input of OR Gate 56. The output of OR Gate 56 is sent to the input of Nonretriggerable One-Shot 58, which is negative-edge triggered. As long as the Appliance, Motor, Machine, or Device Being Monitored 10 is "On," CompOut (or Signal A) remains High. The output of Retriggerable One-Shot 54 (Signal D) is Low, since it hasn't been triggered yet. Because one of the inputs to OR Gate 56 is High, its output is High. When the Appliance, Motor, Machine, or Device Being Monitored 10 begins to turn "Off," CompOut goes from High to Low, which triggers Retriggerable One-Shot 54 and its output goes High. Since one of the inputs to OR Gate 56 is still High, its output remains High. Before Retriggerable One-Shot 54 "times-out," the Appliance, Motor, Machine, or Device Being Monitored 10 may briefly turn "On" to "Off" to "On" several times before it turns "Off" for good. Each "On" to "Off" transition of the Device Being Monitored 10 produces a High to Low transition in CompOut, which retriggers One-Shot 54 and keeps its output, as well as the output of OR Gate 56, High. When the Device Being Monitored 10 turns "Off" for good, it produces a final High to Low transition in CompOut and the CompOut input to OR Gate 56 goes Low. This final High to Low transition in CompOut retriggers, for a final time, One-Shot 54, whose output has been High and continues to remain High until it "times-out" after a fixed time duration, Tos3. The One-Shot's output, as well as the output of OR Gate 56, will then drop from High to Low, which will trigger negative-edge triggered Nonretriggerable One-Shot 58 to produce an output pulse that will remain High for a fixed time, Tos4. This output pulse from One-Shot 58 is the Power-Down Transition State Detection Pulse, also called Signal E, and indicates that the Power-Down Transition State has been detected. It is sent to the Alert Selection Logic Subsystem 220 and to the "Reset" input of RS Flip-Flop 218, whose output then goes from High to Low. The output of RS Flip-Flop 218 is the Power-On Steady State Signal (Signal F), and when it goes from High to Low, it indicates that the Appliance, Motor, Machine, or Device Being Monitored 10 is no longer in the Power-On Steady State Condition. The Power-On Steady State Signal (Signal F) is sent to the Alert Selection Logic Subsystem 220.

Repetitive Alert Signal ON/OFF Duty Cycle Generation Subsystem 290 is used to create the third "Alert Method," a repetitive alert signal that repeats at some predefined frequency with some predefined "On"/"Off" duty cycle. Subsystem 290 consists of three Repetitive Alert Signal Generators 292, 294, and 296. These Repetitive Alert Signal Generators can be oscillator/timer integrated circuits, such as CMOS 555 Timers that can produce repetitive pulse trains. The pulse train repetition rate, the pulse width, and the "On"/"Off" duty cycle can easily be selected for the 555 Timers by selecting the values of two resistors and one capacitor. There is one Repetitive Alert Signal Generator oscillator/timer for each of the three "Alert Types," i.e., the Visual Alert signal, the Audio Alert signal, and the RF Alert signal, and each of these "Alert Types" will most likely have its own unique predefined pulse train repetition rate and predefined "On"/"Off" duty cycle. The repetitive pulse train output of each of the oscillator/timers is sent to Alert Selection Logic Subsystem 220. The three repetitive pulse train outputs are: (1) Signal G from Repetitive Alert Signal Generator 292 for possible use by the Visual Alert Subsystem, (2) Signal H from Repetitive Alert Signal Generator 294 for possible use by the Audio Alert Subsystem, and (3) Signal I from Repetitive Alert Signal Generator 296 for possible use by the RF Alert Subsystem. If the repetitive alert signal "Alert Method" has been selected by the user, using Alert Selector Switch 202, for any of the three "Alert Types," Subsystem 220 uses the correct oscillator/timer signal to produce the proper repetitive pulse train signal for that selected "Alert Type."

The "Alert Type" Subsystems will now be discussed. Visual Alert Subsystem 270 consists of Visual Output Signal Device 274, such as an LED or an incandescent light bulb, and the appropriate Visual Device Driving Circuit 272 for that Visual Output Signal Device. Visual Device Driving Circuit 272 could be as simple as a single transistor amplifier/switch. The signal that drives this Subsystem is Signal J and comes from Alert Selection Logic Subsystem 220. Audio Alert Subsystem 280 consists of Audio Output Signal Device 284, such as an electromechanical buzzer or other sound transducer, and the appropriate Audio Device Driving Circuit 282 for that Audio Output Signal Device. Audio Device Driving Circuit 282 could be as simple as a single transistor amplifier/switch. The signal that drives this Subsystem is Signal K and comes from Alert Selection Logic Subsystem 220. RF Alert Subsystem 60 consists of Data Encoder 62, Address Selector 68, RF (Radio Frequency) Transmitter 64, and Antenna 66. The signal that drives this Subsystem is Signal L and comes from Alert Selection Logic Subsystem 220. The Data Encoder adds a preselected Machine or Device Identification Address Code from Address Selector 68 to the "Alert Condition" Detection Code (which could be as simple as two bits of data) from the Alert Selection Logic Subsystem 220. In this embodiment, Address Selector 68 provides an eight-bit address code, which means the user of the Machine or Device Monitor and Alert Unit 20 can select one of 256 unique Machine or Device Identification Address Codes. The RF Transmitter 64 takes the signal from Data Encoder 62 and transmits an RF Alert signal through Antenna 66 to the RF Receiver/Alert Unit 110 of FIG. 1. RF Alert Subsystem 60 might send out a digitally encoded RF Alert signal using the same OOK (On/Off Keying) AM radio transmission method used by some automobile Remote Key-less Entry RF systems. [Note: RF Alert Subsystem 60 was formerly named Data Encoder/RF Transmitter 60, but was renamed here for consistency.]

The final Subsystem to be described, briefly, is Alert Selection Logic Subsystem 220. A general overview of the operation of Subsystem 220 is discussed here. Subsystem 220 uses: (1) input signals from Alert Selector Switch 202, that have been chosen by the user of the MDMAU 20, (2) input signals A, C, E, and F that have been developed, as previously described, by Alert Condition Detection and False Alert Reduction Subsystem 210, and (3) input signals G, H, and I developed, as previously described, by Repetitive Alert Signal ON/OFF Duty Cycle Generation Subsystem 290, to help produce the correct output signals J, K, and L to be sent to Visual Alert Subsystem 270 (Signal J), Audio Alert Subsystem 280 (Signal K), and RF Alert Subsystem 60 (Signal L). The various ways in which Alert Selection Logic Subsystem 220 uses its input signals to develop its output signals can extend from the fairly simple to the fairly complicated, depending, in part, upon how complicated Alert Selector Switch 202 is configured and what the the user of the MDMAU 20 selects. Several embodiments of Alert Selection Logic Subsystem 220 and Alert Selector Switch 202 will be shown and described in more detail in FIG. 17 and its associated descriptive material.

Figure 16A:
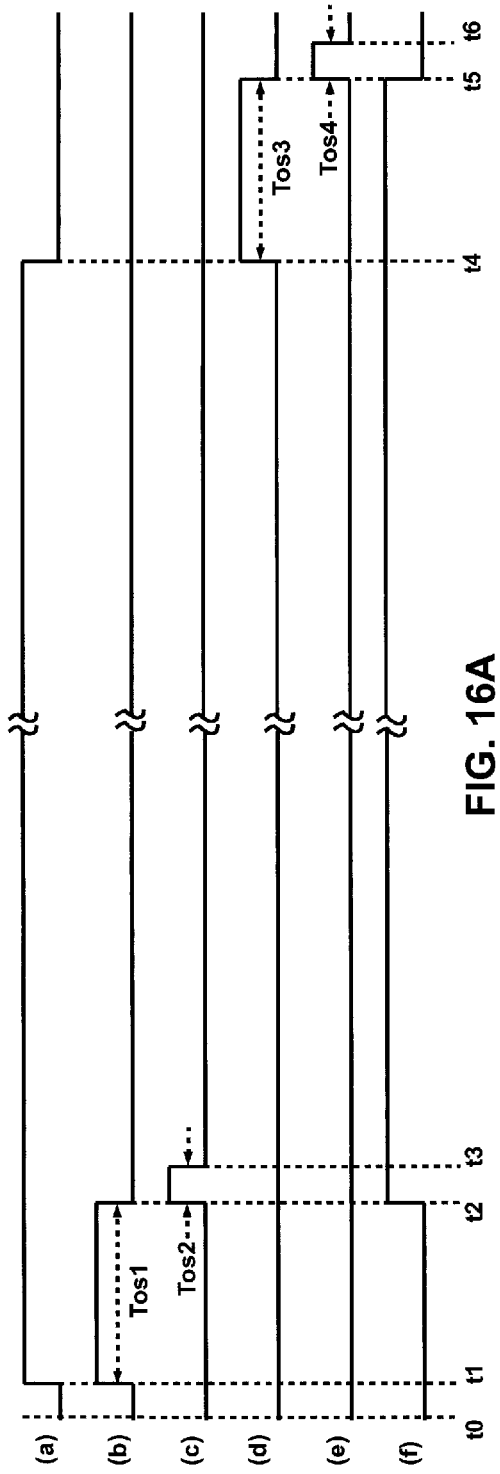
FIG. 16A and FIG. 16B are depictions of the various oscillograms of the signals and timing diagrams for an embodiment of the invention described in FIG. 14 and FIG. 15.
Figure 16B:
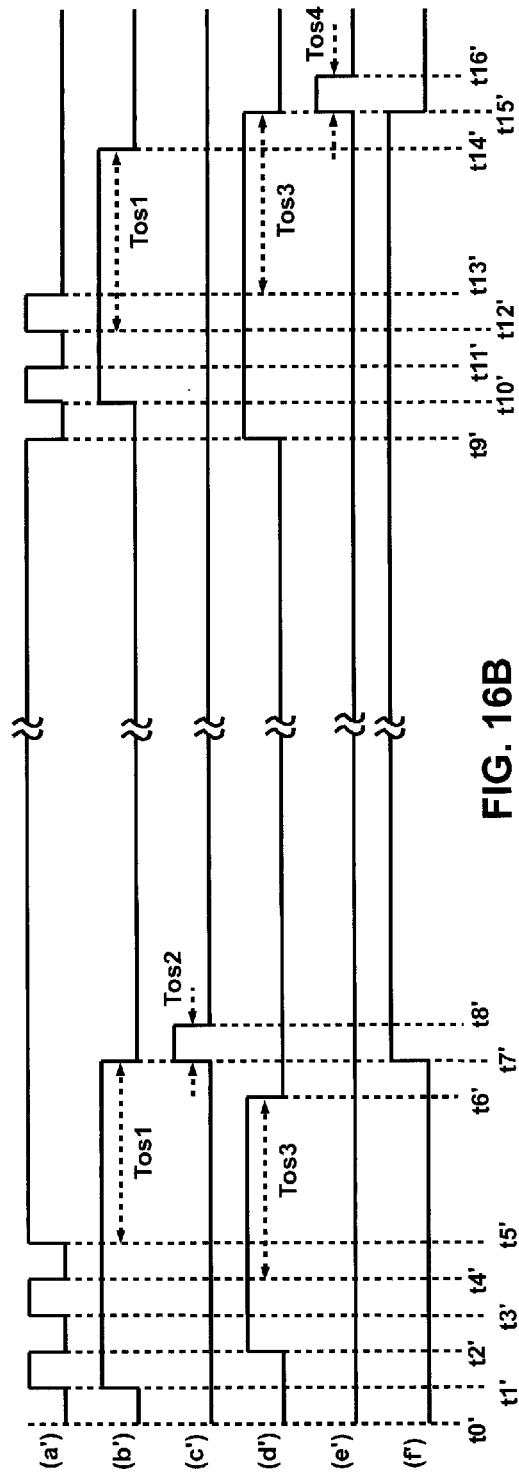

FIG. 16A and FIG. 16B are depictions of the various oscillograms of the signals and timing diagrams for an embodiment of the invention described in FIG. 14 and FIG. 15. Referring to FIG. 14 and FIG. 15, and their descriptions, will aid in understanding the following description of these oscillograms. FIG. 16A and FIG. 16B illustrate the oscillograms of signals at various points within the Machine or Device Monitor and Alert Unit 20 (MDMAU 20) and, more specifically, within Alert Condition Detection and False Alert Reduction Subsystem 210, depicted in FIG. 15, for two cases. The two cases arise from variations in how cleanly the Appliance, Motor, Machine, or Device Being Monitored 10 makes the transition from the "Off" state to the "On" state, and then from the "On" state to the "Off" state. As previously explained, the input to Alert Condition Detection and False Alert Reduction Subsystem 210 is the output of Comparator 52, CompOut (also named Signal A), which indicates whether, in real time, the Appliance, Motor, Machine, or Device Being Monitored 10 is in the "On" state (CompOut is High), or the "Off" state (CompOut is Low), or is changing states.

The oscillograms for Case 1 are shown in FIG. 16A, and, for Case 2, are shown in FIG. 16B. Oscillograms (a) and (a') depict the input signal CompOut (or Signal A) for Case 1 and Case 2, respectively. They represent the "On" and "Off" operational state of the Appliance, Motor, Machine, or Device Being Monitored 10 in real time. Oscillograms (b) and (b') depict Signal B, the output signal of Retriggerable One-Shot 212 for Case 1 and Case 2, respectively. Oscillograms (c) and (c') depict Signal C, the output signal of Nonretriggerable One-Shot 216 for Case 1 and Case 2, respectively. Oscillograms (d) and (d') depict Signal D, the output signal of Retriggerable One-Shot 54 for Case 1 and Case 2, respectively. Oscillograms (e) and (e') depict Signal E, the output signal of Nonretriggerable One-Shot 58 for Case 1 and Case 2, respectively. Oscillograms (f) and (f') depict Signal F, the output signal of RS Flip-Flop 218 for Case 1 and Case 2, respectively.

Case 1 is the simplest and cleanest case. It occurs when no temporary extraneous "On"/"Off" fluctuations occur while the Device Being Monitored 10 makes the transition from the "Off" state to the "On" state, and then from the "On" state to the "Off" state. Case 2 is the more complicated case. It occurs when temporary extraneous "On"/"Off" fluctuations do occur while the Device Being Monitored 10 makes the transition from the "Off" state to the "On" state, and then from the "On" state to the "Off" state.

We shall explain the oscillogram signals for Case 1, depicted in FIG. 16A, first. Please note that, for completeness, we may discuss the inputs and outputs of Inverter 213, OR Gate 214, and OR Gate 56, but these signals are not shown in the oscillograms of FIG. 16A. An explanation of how the Power-Up Transition State is detected for Case 1 follows. All the oscillograms start out at time t0, when the Device Being Monitored 10 is in the "Off" state and CompOut is low. As long as the Device Being Monitored 10 is "Off," CompOut (Signal A) remains Low, the output of Inverter 213, which is an input to OR Gate 214, is High, so the output of OR Gate 214 is High. The outputs of Retriggerable One-Shot 212 (Signal B) and Retriggerable One-Shot 54 (Signal D) remain Low, since they haven't been triggered yet. When the Device Being Monitored 10 begins to turn "On," CompOut (Signal A) goes from Low to High, at time t1. This triggers Retriggerable One-Shot 212, since it is positive-edge triggered, and its output, Signal B, goes High. [Retriggerable One-Shot 54 is not triggered, since it is negative-edge triggered.] The output of Inverter 213, which is an input to OR Gate 214, goes Low, but since the other input (Signal B) to OR Gate 214 goes High, the output of OR Gate 214 remains High. After time period Tos1 passes, Retriggerable One-Shot 212 "times out" at time t2 and its output goes from High to Low, so both inputs to OR Gate 214 become Low. This makes the output of OR Gate 214 go from High to Low and this triggers Nonretriggerable One-Shot 216, since it is negative-edge triggered. Its output goes from Low to High and stays High until time period Tos2 passes, when it "times out" at time t3, and its output goes from High to Low. This output pulse from One-Shot 216 is the Power-Up Transition State Detection Pulse (Signal C), and indicates that the Power-Up Transition State has been detected. It is sent to the Alert Selection Logic Subsystem 220 and to the "Set" input of RS Flip-Flop 218, whose output then goes from Low to High as soon as the pulse occurs at time t2. The output of RS Flip-Flop 218 is the Power-On Steady State Signal (also named Signal F) and when it goes from Low to High, it indicates that the Appliance, Motor, Machine, or Device Being Monitored 10 is in the Power-On Steady State Condition. It will stay High while the Device Being Monitored 10 remains "On" in the Power-On Steady State Condition, until the Power-Down Transition State for Case 1 is detected, which we will explain now. As long as the Device Being Monitored 10 is "On" in the Power-On Steady State Condition, CompOut (Signal A) remains High, and since it is an input to OR Gate 56, the output of OR Gate 214 is High. The outputs of Retriggerable One-Shot 212 (Signal B) and Retriggerable One-Shot 54 (Signal D) remain Low, since they haven't been triggered yet. When the Device Being Monitored 10 begins to turn "Off," CompOut (Signal A) goes from High to Low, at time t4, which triggers Retriggerable One-Shot 54, since it is negative-edge triggered, and its output, Signal D, which is an input to OR Gate 56, goes High. [Retriggerable One-Shot 212 is not triggered, since it is positive-edge triggered.] Although the Signal A input to OR Gate 56 goes Low, the other input (Signal D) to OR Gate 56 goes High, and the output of OR Gate 56 remains High After time period Tos3 passes, Retriggerable One-Shot 54 "times out" at time t5 and its output goes from High to Low, so both inputs to OR Gate 56 become Low. This makes the output of OR Gate 56 go from High to Low at time t5, and this triggers Nonretriggerable One-Shot 58, since it is negative-edge triggered. Its output goes from Low to High at time t5 and stays High until time period Tos4 passes, when it "times out" at time t6, and its output goes from High to Low. This output pulse from One-Shot 58 is the Power-Down Transition State Detection Pulse (Signal E), and indicates that the Power-Down Transition State has been detected. It is sent to the Alert Selection Logic Subsystem 220 and to the "Reset" input of RS Flip-Flop 218, whose output then goes from High to Low as soon as the Reset pulse occurs at time t5. The output of RS Flip-Flop 218 is the Power-On Steady State Signal (Signal F), and when it goes from High to Low, it indicates that the Appliance, Motor, Machine, or Device Being Monitored 10 is no longer in the Power-On Steady State Condition. The Power-On Steady State Signal (Signal F) is sent to the Alert Selection Logic Subsystem 220. This is the end of the explanation of the oscillograms of FIG. 16A for Case 1.

We shall now explain the oscillogram signals for Case 2, depicted in FIG. 16B, which are produced when temporary extraneous "On"/"Off" fluctuations occur while the Device Being Monitored 10 makes the transition from the "Off" state to the "On" state, and then from the "On" state to the "Off" state. Please note that, for completeness, we may discuss the inputs and outputs of Inverter 213, OR Gate 214, and OR Gate 56, but these signals are not shown in the oscillograms of FIG. 16B. We will now show how the Power-Up Transition State is detected. All the oscillograms start out at time t0', when the Device Being Monitored 10 is in the "Off" state and CompOut (Signal A) is Low. As long as the Device Being Monitored 10 is "Off," CompOut (Signal A) remains Low, the output of Inverter 213, which is an input to OR Gate 214, is High, so the output of OR Gate 214 is High. The outputs of Retriggerable One-Shot 212 (Signal B) and Retriggerable One-Shot 54 (Signal D) remain Low, since they haven't been triggered yet. Since both the input signals to OR Gate 56 are Low, the output of OR Gate 56 is Low. In Case 2, we will show two brief extraneous "On"/"Off" state pulses that occur while the Device Being Monitored 10 begins to turn "On." When the first extraneous "On" state occurs, the Device Being Monitored 10 begins to turn "On," and CompOut (Signal A) goes from Low to High, at time t1'. This triggers Retriggerable One-Shot 212, since it is positive-edge triggered, and its output, Signal B, goes High. [Retriggerable One-Shot 54 is not triggered, since it is negative-edge triggered.] The output of Inverter 213, which is an input to OR Gate 214, goes Low, but since the other input (Signal B) to OR Gate 214 goes High, the output of OR Gate 214 remains High. Also, since the Signal A input to OR Gate 56 goes High, the output of OR Gate 56 goes High at time t1'. At time t2', the first extraneous "On" state pulse ends, the Device Being Monitored 10 turns "Off," and CompOut (Signal A) goes from High to Low This triggers Retriggerable One-Shot 54, since it is negative-edge triggered, and its output, Signal D, goes High. [Retriggerable One-Shot 212 is not retriggered, since it is positive-edge triggered.] Although the Signal A input to OR Gate 56 goes Low, the other input, Signal D from One-Shot 54, goes High, and the output of OR Gate 56 remains High. When the second extraneous "On" state occurs, the Device Being Monitored 10 begins to turn "On" again and CompOut (Signal A) goes from Low to High, at time t3'. This retriggers Retriggerable One-Shot 212, since it is positive-edge triggered, and its output, Signal B, remains High. [Retriggerable One-Shot 54 is not retriggered, since it is negative-edge triggered. Its output Signal D remains High.] The output of Inverter 213, which is an input to OR Gate 214, goes Low, but since the other input (Signal B) to OR Gate 214 remains High, the output of OR Gate 214 remains High. [Also, since the Signal D input to OR Gate 56 stays High, the output of OR Gate 56 remains High.] At time t4', the second extraneous "On" state pulse ends and the Device Being Monitored 10 turns "Off." This retriggers Retriggerable One-Shot 54, since it is negative-edge triggered. Its output, Signal D, remains High for time period Tos3. [Retriggerable One-Shot 212 is not retriggered, since it is positive-edge triggered. Its output Signal B remains High.] At time t5', when the final true "On" state occurs, the Device Being Monitored 10 begins to turn "On" again, for good, and CompOut (Signal A) goes from Low to High. This retriggers Retriggerable One-Shot 212, since it is positive-edge triggered, and its output (Signal B) remains High for a time period Tos1. [Retriggerable One-Shot 54 is not retriggered, since it is negative-edge triggered. Its output Signal D remains High, until it "times out" at time t6', and goes Low. This "time out" is ignored by OR Gate 56, since its other input, Signal A, is still High, and remains High while the Device Being Monitored remains "On." Thus, the output of OR Gate 56 remains High until Signal A goes Low, which indicates that the Device Being Monitored is turning "Off" at some time t9', in the distant future.] The output of Inverter 213, which is an input to OR Gate 214, goes Low, but since the other input (Signal B) to OR Gate 214 remains High, the output of OR Gate 214 remains High. After time period Tos1 passes, Retriggerable One-Shot 212 "times out" at time t7' and its output Signal B goes from High to Low, so both inputs to OR Gate 214 become Low. This makes the output of OR Gate 214 go from High to Low and this triggers Nonretriggerable One-Shot 216, since it is negative-edge triggered. Its output goes from Low to High at time t7' and stays High until time period Tos2 passes, when it "times out" at time t8', and its output goes from High to Low. This output pulse from One-Shot 216 is the Power-Up Transition State Detection Pulse (Signal C), and indicates that the Power-Up Transition State has been detected. It is sent to the Alert Selection Logic Subsystem 220 and to the "Set" input of RS Flip-Flop 218, whose output then goes from Low to High as soon as the pulse occurs at time t7'. The output of RS Flip-Flop 218 is the Power-On Steady State Signal (also named Signal F). When it goes from Low to High, it indicates that the Appliance, Motor, Machine, or Device Being Monitored 10 is in the Power-On Steady State Condition. It will stay High while the Device Being Monitored 10 remains "On" in the Power-On Steady State Condition, until the Power-Down Transition State for Case 2 is detected.

An explanation of how the Power-Down Transition State for Case 2 is detected is given now. We will start out when the Device Being Monitored 10 remains in the Power-On Steady State Condition for some undetermined length of time between time t8' and time t9'. As long as the Device Being Monitored 10 is "On," CompOut (Signal A) remains High. Signal A is an input to OR Gate 56, so the output of OR Gate 56 is High. Signal A is also an input to Inverter 213, so the output of Inverter 213, which is an input to OR Gate 214, is Low. The outputs of Retriggerable One-Shot 212 (Signal B) and Retriggerable One-Shot 54 (Signal D) remain Low, because they haven't been triggered for a long time since the Power-Up Transition State occurred. Since both the input signals to OR Gate 214 are Low, the output of OR Gate 214 is Low. In Case 2, we will show the results of two brief extraneous "On"/"Off" state pulses that occur before the Device Being Monitored 10 begins to turn "Off" permanently. When the first extraneous "Off" state occurs, the Device Being Monitored 10 begins to turn "Off," and CompOut (Signal A) goes from High to Low, at time t9'. This triggers Retriggerable One-Shot 54, since it is negative-edge triggered, and its output, Signal D, goes from Low to High, at time t9'. [Retriggerable One-Shot 212 is not triggered, since it is positive-edge triggered. The output of Inverter 213, an input to OR Gate 214, goes High, so the output of OR Gate 214 goes High, at time t9'.] Although the Signal A input to OR Gate 56 goes Low, the other input (Signal D from One-Shot 54) goes High, and the output of OR Gate 56 remains High, at time t9'. At time t10', the first extraneous "On" state pulse begins, the Device Being Monitored 10 turns "On," and CompOut (Signal A) goes from Low to High. [This triggers Retriggerable One-Shot 212, since it is positive-edge triggered, and its output, Signal B, goes High at time t10'. Although the output of Inverter 213, an input to OR Gate 214, goes Low, the other input, Signal D from One-Shot 212, goes High, and the output of OR Gate 214 remains High.] Retriggerable One-Shot 54 is not retriggered at time t10', since it is negative-edge triggered, but its output (Signal D) remains High, so the output of OR Gate 56 remains High. When the second extraneous "Off" state occurs, the Device Being Monitored 10 begins to turn "Off," and CompOut (Signal A) goes from High to Low, at time t11'. This retriggers Retriggerable One-Shot 54, since it is negative-edge triggered, and its output, Signal D, remains High, at time t11'. Therefore, the output of OR Gate 56 remains High. [Retriggerable One-Shot 212 is not retriggered, since it is positive-edge triggered. Its output remains High and, thus, the output of OR Gate 214 remains High.] When the second extraneous "On" state occurs, the Device Being Monitored 10 begins to turn "On" again and CompOut (Signal A) goes from Low to High, at time t12'. [This retriggers Retriggerable One-Shot 212, since it is positive-edge triggered, and its output, Signal B, remains High. Thus, the output of OR Gate 214 remains High.] Retriggerable One-Shot 54 is not retriggered, since it is negative-edge triggered, and its output (Signal D) remains High. Therefore, the output of OR Gate 56 remains High. At time t13', when the final true "Off" state occurs, the Device Being Monitored 10 begins to turn "Off" again, for good, and CompOut (Signal A) goes from High to Low. This retriggers Retriggerable One-Shot 54, since it is negative-edge triggered, for the last time. Its output (Signal D) remains High for time period Tos3. [Retriggerable One-Shot 212 is not retriggered, since it is positive-edge triggered. Its output (Signal B) remains High (for a time period Tos1 that began at time t12', when One-Shot 212 was retriggered) until it "times out" at time t14', and goes Low. This "time out" is ignored by OR Gate 214, whose output remains High, because its other input, the output of Inverter 213 (Inverted Signal A), went from Low to High previously at time t13' and remains High for as long as the Device Being Monitored 10 remains "Off.". Nonretriggerable One-Shot 216 is not triggered, and there is no false Power-Down Transition State Detection Pulse produced here.] After time period Tos3 passes, Retriggerable One-Shot 54 "times out" at time t15' and its output Signal D goes from High to Low, so both inputs to OR Gate 56 become Low. This makes the output of OR Gate 56 go from High to Low and this triggers Nonretriggerable One-Shot 58, since it is negative-edge triggered. Its output goes from Low to High at time t15' and stays High until time period Tos4 passes, when it "times out" at time t16', and its output goes from High to Low. This output pulse from One-Shot 58 is the Power-Down Transition State Detection Pulse (Signal E), and indicates that the Power-Down Transition State has been detected. It is sent to the Alert Selection Logic Subsystem 220 and to the "Reset" input of RS Flip-Flop 218, whose output then goes from High to Low as soon as the Reset pulse occurs at time t15'. The output of RS Flip-Flop 218 is the Power-On Steady State Signal (Signal F). When it goes from High to Low, it indicates that the Appliance, Motor, Machine, or Device Being Monitored 10 is no longer in the Power-On Steady State Condition and is truly "Off" and not operating. This is the end of the explanation of the oscillograms of FIG. 16B for Case 2.

Figure 17:
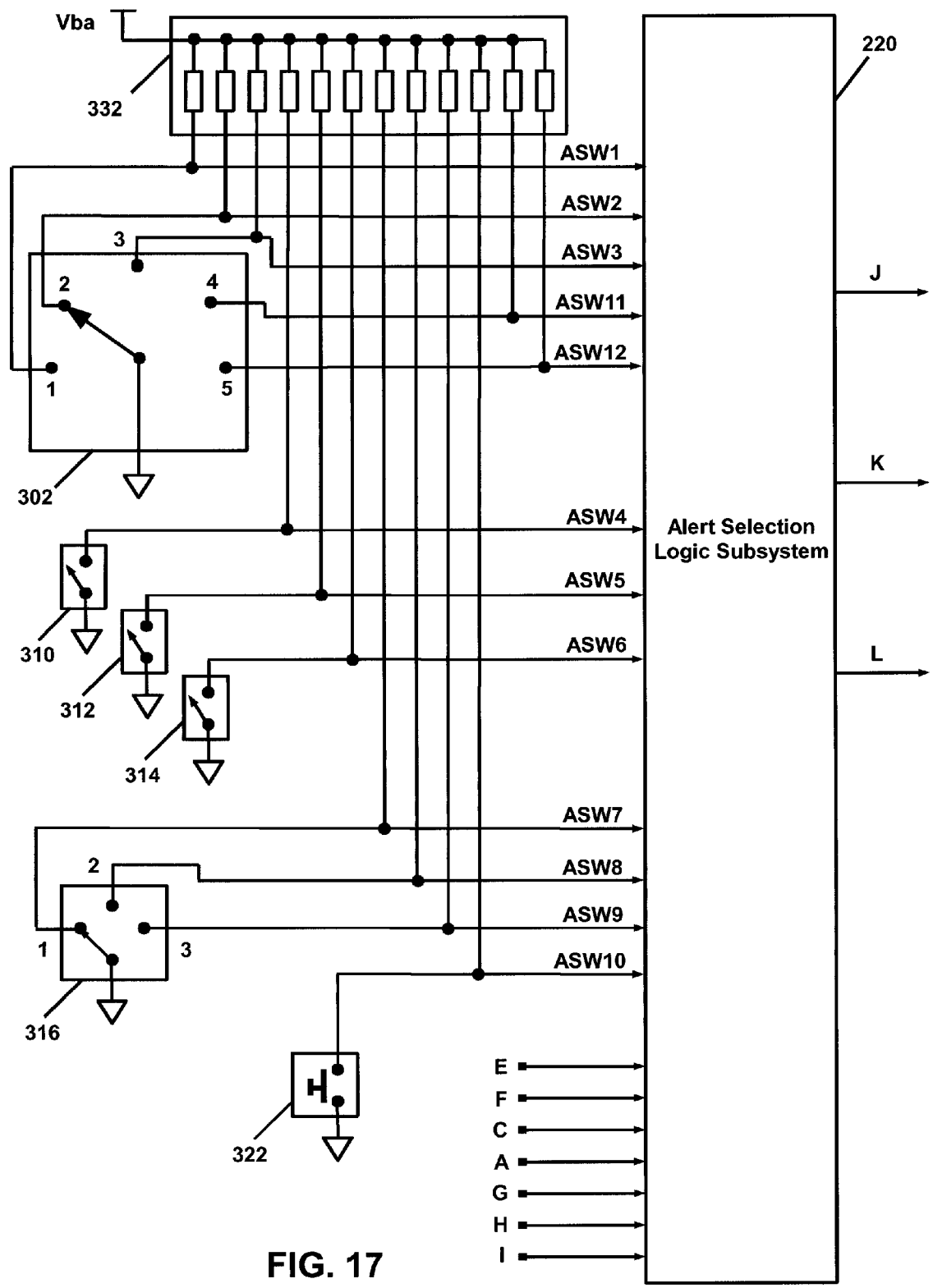
FIG. 17 is the electrical schematic drawings, in block diagram format, of a portion of the electronic system included in the Machine or Device Monitor and Alert Unit 20 (MDMAU 20) of the general embodiment of the invention shown in FIG. 14 and FIG. 15.

FIG. 17 is the electrical schematic drawings, in block diagram format, of a portion of the electronic system included in the Machine or Device Monitor and Alert Unit 20 (MDMAU 20) of the general embodiment of the invention shown in FIG. 14 and FIG. 15. In particular, FIG. 17 details a version of Alert Selector Switch 202 that provides twelve input signals from the switches, designated ASW1 through ASW12, to the Alert Selection Logic Subsystem 220, which provides output signals to the three Alert Types.

We shall first begin a discussion of Alert Selector Switch 202. Alert Selector Switch 202 is actually made up of several switches and allows the user of the Machine or Device Monitor and Alert Unit 20 (MDMAU 20) to select, at his discretion, which of the "Alert Conditions," "Alert Types," and "Alert Methods" will be used during the operation of the MDMAU 20. Each of these three terms was explained in detail in the descriptive material of FIG. 15, but we shall briefly reiterate the definitions here.

The term "Alert Condition" has to deal with three conditions (or states) that occur as parts of the operational state signal of the Appliance, Motor, Machine, or Device Being Monitored 10. These conditions (or states) can be detected by the Machine or Device Monitor and Alert Unit 20 (MDMAU 20) which can provide some kind of alert, when the conditions are detected, if the user so desires. The three "Alert Conditions" (or states) are: (1) the Power-Up Transition State, (2) the Power-On Steady State, and (3) the Power-Down Transition State. The Power-Up Transition State occurs when the Device Being Monitored 10 makes the transition from the "Off" state to the "On" state and stays "On" for some reasonable period of time, called Tos1 in FIG. 16. The Power-On Steady State occurs when the Device Being Monitored 10 stays continuously "On" (otherwise known as the "steady state") beyond time period Tos1 and lasts until the The Power-Down Transition State occurs. The Power-Down Transition State occurs when the Device Being Monitored 10 makes the transition from the "On" state to the "Off" state and stays "Off" for some reasonable period of time, called Tos3 in FIG. 16. Using part of Alert Selector Switch 202, the user of the MDMAU 20 may select which Alert Condition should be monitored and detected, when it occurs, by the MDMAU 20.

The term "Alert Type" has to do with the devices or means that the Machine or Device Monitor and Alert Unit 20 (MDMAU 20) can employ to alert the user when any one (or more) of the "Alert Conditions," described above, has been detected by the MDMAU 20. The three "Alert Types" are: (1) a Visual Alert signal, (2) an Audio Alert signal, or (3) an RF Alert signal. Using part of Alert Selector Switch 202, the user of the MDMAU 20 may select which Alert Type (or Types) may be used by the MDMAU 20 to produce an Alert Signal or Signals, may be d. A Visual Alert signal could be the light signal produced by an LED or an incandescent light bulb. An Audio Alert signal could be the sound from an electromechanical buzzer or other sound transducer. An RF Alert signal could be the Radio Frequency (RF) transmissions sent out by the MDMAU 20, that might be encoded digitally using the same OOK (On/Off Keying) AM radio transmission method used by some automobile Remote Key-less Entry RF systems.

The term "Alert Method" has to do with how often the "Alert Types," described above, will produce Alert signals, once any one (or more) of the "Alert Conditions," previously described, has been detected by the MDMAU 20. The three "Alert Methods" are: (1) a single pulse (or one-shot) Alert signal, (2) a continuously operated Alert signal, or (3) a repetitive Alert signal that repeats at some predefined frequency with some predefined "On"/"Off" duty cycle. Using part of Alert Selector Switch 202, the user of the MDMAU 20 may select any one of the "Alert Methods" to apply to any one, two, or three of the "Alert Types," when any one of the three "Alert Conditions" has been detected by the MDMAU 20, although, as a practical matter, the single pulse alert signal would most likely not be an appropriate alert signal when the Power-On Steady State "Alert Condition" has been detected.

The Tracking On/Off State Signal is a new signal defined here. It is a buffered version of the output of Comparator 52 (also called CompOut or Signal A), and it is to be sent to Alert Types selected by the user of MDMAU 20. When it is selected, it overrides the selection of any of the Alert Conditions and disregards the selection of any of the Alert Methods.

There are several aspects common to all the Alert Selector Switches shown in FIG. 17. First, each of the switches needs a "pull-up" resistor, which pulls the switch output terminal to the battery voltage (Vba) of MDMAU 20. These "pull-up" resistors are provided by Resistor Array 332, which contains twelve resistors in FIG. 17. Each of the resistors has one terminal attached to a common node inside Resistor Array 332 that is connected to Vba, while the other terminal is connected to a terminal of a switch and to an input of Alert Selection Logic Subsystem 220. The other terminal of each switch is connected to ground. When the switch is left open (Off), the switch signal provided to the input of Alert Selection Logic Subsystem 220 is Vba (or High). Thus, in this embodiment, all the digital inputs to Alert Selection Logic Subsystem 220 from all the switches shown in FIG. 17 are "Active Low" inputs, meaning a Low signal from the switch indicates that the choice represented by that switch has been selected by the user.

Table 1 below defines each of the switches shown in FIG. 17, that are collectively called Alert Switch 202:

| Switch/Signal Name | Switch Description/Number | Switch Signal Name |
| --- | --- | --- |
| Power-Up Transition State | Rotary Switch 302-- Pos. 1 | ASW1 |
| Power-On Steady State | Rotary Switch 302-- Pos. 2 | ASW2 |
| Power-Down Transition St. | Rotary Switch 302-- Pos. 3 | ASW3 |
| Visual Alert Type | SPST Switch 310 | ASW4 |
| Audio Alert Type | SPST Switch 312 | ASW5 |
| RF Alert Type | SPST Switch 314 | ASW6 |
| Single Pulse Alert Signal | Rotary Switch 316-- Pos. 1 | ASW7 |
| Continuous Alert Signal | Rotary Switch 316-- Pos. 2 | ASW8 |
| Repetitive On/Off Alert Sig. | Rotary Switch 316-- Pos. 3 | ASW9 |
| Stop Continuous/Rep. Sig. | Push-button Switch 322 | ASW10 |
| Pwr-Up & Pwr-Down St. | Rotary Switch 302-- Pos. 4 | ASW11 |
| Tracking On/Off St. Signal | Rotary Switch 302-- Pos. 5 | ASW12 |

(1) The single Alert Conditions are selected by switch signals ASW1, ASW2, and ASW3.
(2) Two Alert Conditions (the Power-Up Transition State and the Power-Down Transition State) are selected at the same time by ASW11.
(3) The Tracking On/Off State Signal (Comparator 52 Output) is selected by switch signal ASW12.
(4) The three Alert Types are selected by switch signals ASW4, ASW5, and ASW6.
(5) The three Alert Methods are selected by switch signals ASW7, ASW8, and ASW9.
(6) The Continuous or Repetitive On/Off Signals are stopped by Push-button switch signal ASW10.
(7) Please note that the Active High versions of all the ASWxx switch signals shown in FIG. 17 are the negated (or inverted) versions of those signals.

Alert Selection Logic Subsystem 220, which is shown in FIG. 17, is discussed in the descriptive material of FIG. 15. However, we will revisit the discussion here. Subsystem 220 uses: (1) the input signals from the various Alert Selector Switches, ASW1 through ASW12, as defined above, that have been chosen by the user of the MDMAU 20, (2) input signals A, C, E, and F that have been developed, as previously described, by Alert Condition Detection and False Alert Reduction Subsystem 210, and (3) input signals G, H, and I developed, as previously described, by Repetitive Alert Signal ON/OFF Duty Cycle Generation Subsystem 290, to produce the correct output signals J, K, and L to be sent to Visual Alert Subsystem 270 (Signal J), Audio Alert Subsystem 280 (Signal K), and RF Alert Subsystem 60 (Signal L). Note that the three repetitive pulse train signals G, H, and I, which were developed by Repetitive Alert Signal ON/OFF Duty Cycle Generation Subsystem 290, are only used to help produce the Repetitive On/Off Alert Signal when ASW9 is selected by the user of the MDMAU 20. If ASW4 is also active, Signal G is used to create the Repetitive On/Off pulse train for the Visual Alert Subsystem 270. If ASW5 is also active, Signal H is used to create the Repetitive On/Off pulse train for the Audio Alert Subsystem 280. If ASW6 is also active, Signal I is used to create the Repetitive On/Off pulse train for the RF Alert Subsystem 60. In addition, with regard to producing either a Continuous Alert Signal or a Repetitive On/Off Alert Signal, two input signals to Subsystem 220 need to create two new signals internal to Subsystem 220. When a Power-Up Transition State Detection Pulse (input Signal C) occurs, a RS Flip-Flop will be set, producing Signal C'. When a Power-Down Transition State Detection Pulse (input Signal E) occurs, a RS Flip-Flop will be set, producing Signal E'. Signal C' is used to produce the Power-Up Transition State Continuous Alert Signal or the Power-Up Transition State Repetitive On/Off Alert Signal. Signal E' is used to produce the Power-Down Transition State Continuous Alert Signal or the Power-Down Transition State Repetitive On/Off Alert Signal. Signals C' and E', as well as associated Continuous Alert Signals and Repetitive On/Off Alert Signals will not turn off until the "Stop Continuous/Repetitive Signals" Push-button signal ASW10 occurs. Alert Selection Logic Subsystem 220 also contains a logic module that prevents the Power-Down Transition State Detection Pulse from being considered legitimate unless a legitimate Power-Up Transition State Detection Pulse has occurred. This will help prevent false Power-Down Transition State Detection Alert output signals from being sent to any of the Alert Subsystems. Alert Selection Logic Subsystem 220 can perform a simple task to make the switch arrangements of this embodiment more easily useable. In order to use Active High Logic, all the input signals, ASW1 through ASW12, can be inverted immediately upon entry into Subsystem 220. Also, in order to make ASW11, which is produced by Rotary Switch 302—Position 4, viable, Subsystem 220 must use two OR Gates. [Note: An active ASW11 signal means that the user wishes to have both the Power-Up Transition State Alert Condition and the Power-Down Transition State Alert Condition detected, and produce Alerts, during the monitoring of one "On"/Off" operation of the Appliance, Motor, Machine, or Device Being Monitored 10.] One OR Gate uses the inverted ASW11 signal as one input and the inverted ASW1 signal, from Rotary Switch 302—Position 1, as the other input. This means that if either switch position is active, the Power-Up Transition State Alert Condition will be detected. The other OR Gate uses the inverted ASW11 signal as one input and the inverted ASW3 signal, from Rotary Switch 302—Position 3, as the other input. This means that if either switch position is active, the Power-Down Transition State Alert Condition will be detected.

We shall now provide several examples of how the switches shown in FIG. 17 may be selected to provide the correct Alerts from MMDAU 20. Example one: The user of the MDMAU 20 wishes to detect the Power-Up Transition State Alert Condition and, when detected, provide a Single Pulse Alert Signal from all the Alert Types, i.e. from Visual Alert Subsystem 270, from Audio Alert Subsystem 280, and from RF Alert Subsystem 60. He would select Position 1 of Rotary Switch 302, turn on SPST Switch 310, turn on SPST Switch 312, turn on SPST Switch 314, and select Position 1 of Rotary Switch 316. Example two: The user wishes to detect the Power-Down Transition State Alert Condition and, when detected, provide a Repetitive On/Off Alert Signal from Visual Alert Subsystem 270, and from RF Alert Subsystem 60. He would select Position 3 of Rotary Switch 302, turn on SPST Switch 310, turn on SPST Switch 314, and select Position 3 of Rotary Switch 316. The Repetitive On/Off Alert Signals would continue and not turn off until the user pushes the "Stop Continuous/Repetitive Signals" Push-button and signal ASW10 occurs. Example three: The user wishes to detect both the Power-Up Transition State Alert Condition and the the Power-Down Transition State Alert Condition and, when detected, provide a Single Pulse Alert Signal from all the Alert Types, i.e. from Visual Alert Subsystem 270, from Audio Alert Subsystem 280, and from RF Alert Subsystem 60. He would select Position 4 of Rotary Switch 302, turn on SPST Switch 310, turn on SPST Switch 312, turn on SPST Switch 314, and select Position 1 of Rotary Switch 316. Example four: The user wishes to Track the ongoing "On"/ "Off" State Signal of the Appliance, Motor, Machine, or Device Being Monitored 10 in real time. i.e., display the buffered version of the output of Comparator 52 (also called CompOut or Signal A) on Visual Alert Subsystem 270 only. [This would make the Machine or Device Monitor and Alert Unit 20 a local Unit only.] He would select Position 5 of Rotary Switch 302 and turn on SPST Switch 310. He would not care what Position of Rotary Switch 316 was selected.

Figure 18:
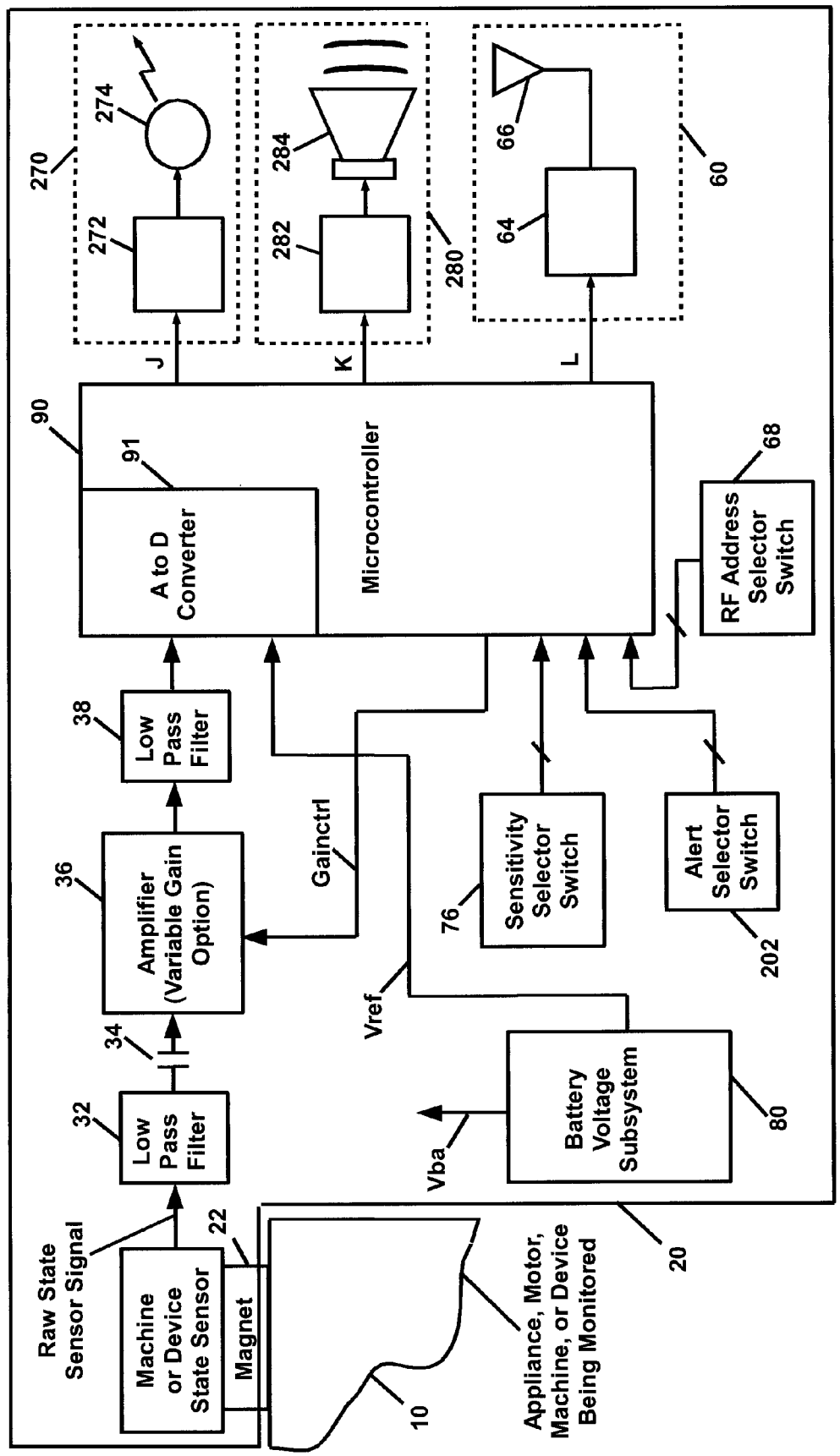
FIG. 18 is a block diagram of the electrical schematic drawing of the electronic system included in the Machine or Device Monitor and Alert Unit 20 (MDMAU 20) of another embodiment of the invention.

FIG. 18 is a block diagram of the electrical schematic drawing of the electronic system included in the Machine or Device Monitor and Alert Unit 20 (MDMAU 20) of another embodiment of the invention. This embodiment shows an MDMAU 20 which utilizes a microcontroller to replace much of the electronic circuitry described in the embodiments of FIG. 2, FIG. 6, FIG. 14, and FIG. 15. In this embodiment, as shown in FIG. 18, the self-contained MDMAU 20 includes Attachment Apparatus 22 (which is a magnet in this embodiment) and a Machine or Device State Sensor selected from the five types listed in the discussion of FIG. 14. These five types of sensors are: (1) a small, 3-axis accelerometer Vibration Sensor 24, as described in FIG. 2, or (2) a single axis velocity sensor Vibration Sensor 24, as described in FIG. 3, or (3) a Magnetic Field Sensor 26 (surrounding a power cord), as described in FIG. 4, or (4) an Audio Microphone Sensor 28, as described in FIG. 5, or (5) an Electromagnetic Field Sensor 29, as described in FIG. 13. Additionally, as shown in FIG. 18, the self-contained MDMAU 20 also includes four components of Signal Conditioning Circuitry 30 (Low Pass Filter 32, DC Blocking Capacitor 34, Variable Gain Amplifier 36, and Low Pass Filter 38) that are appropriate for the chosen sensor; Sensitivity Selector Switch 76, which was originally part of Sensitivity Selection Circuitry 70; Battery Voltage Subsystem 80; RF Address Selector Switch 68; Alert Selector Switch 202; Visual Alert Subsystem 270; Audio Alert Subsystem 280; RF Alert Subsystem 60; and Microcontroller 90, which contains A to D Converter 91. MDMAU 20 is attached by the user to any metallic (ferromagnetic material) location on the Appliance, Motor, Machine, or Device Being Monitored 10 (using the magnetic force from Magnet 22). The Machine or Device State Sensor selected from the five types listed above, and previously discussed in the FIG. 14, produces an electrical signal that follows the operational state of the Appliance, Motor, Machine, or Device Being Monitored 10, and can be used to determine when that device is in the "On" state or in the "Off" state. The Machine or Device State Sensor sends its raw analog state sensor output signal through Low Pass Filter 32, DC Blocking Capacitor 34, Variable Gain Amplifier 36, and Low Pass Filter 38 that are appropriate for that sensor. DC (direct current) Blocking Capacitor 34 is used because we are only interested in the alternating current (AC) portion of the Machine or Device State Sensor signals, since the AC signals are an indication of the "On"/"Off" operational state of the Device Being Monitored 10. In this embodiment, Amplifier 36 is a variable gain amplifier, with the gain being controlled by the "Gainctrl" signal, which is an output from Microcontroller 90. The amplified signal from Amplifier 36 is then sent to Low Pass Filter 38, which consists of a first (or much higher) order low pass filter. Low Pass Filter 38 is an anti-aliasing low pass filter for A to D Converter 91. The filter's frequency break point is determined by the Nyquist criterion and depends upon the sampling rate of A to D Converter 91. This amplified and filtered analog voltage state sensor signal follows the operational state of the Device Being Monitored 10, in real time, and is sent to the input of A to D Converter 91, which is typically part of Microcontroller 90. A to D Converter 91 rapidly digitizes the analog signal from Low Pass Filter 38 and the A to D results are stored in Microcontroller 90. Microcontroller 90 contains RAM, ROM, many digital inputs that all have pull up resistors, several digital outputs, and a Central Processing Unit (CPU), that performs many software algorithms, several of which we will discuss in greater detail below. As in the embodiment of FIG. 2, the MDMAU 20 is powered by Battery Voltage Subsystem 80. It provides battery Voltage "Vba" to all of the components contained in the MDMAU 20, has a Low Battery Voltage Detector 86 and Low Battery Voltage Detector LED 88, and Precision Voltage Reference 84, which provides "Vref" as an input to A to D Converter 91. In this embodiment, a software algorithm of Microcontroller 90 performs the operations of Rectifier 44, Low Pass Filter 48, and, if needed, Integrator 42 and Signal Combining Circuit 48, that are detailed in the description of FIG. 2, to develop a software version of the Conditioned Sensor "Moving Average" Signal, described in FIG. 14, from the digitized analog voltage state sensor signal provided by A to D Converter 91.

In this embodiment, there are three sensitivity ranges: (1) a "Low" sensitivity range, (2) a "Normal" sensitivity range, and (3) a "High" sensitivity range. These sensitivity ranges relate to the magnitude of the amplitude of the raw analog state sensor output signal that the Machine or Device State Sensor generates while it follows the operational state of the Appliance, Motor, Machine, or Device Being Monitored 10. The proper sensitivity range is necessary to allow the Machine or Device Monitor and Alert Unit 20 to correctly produce Alerts, without being too sensitive and thereby producing false Alerts. The user of the MDMAU 20 may select any of the three sensitivity ranges, as required, using Sensitivity Selector Switch 76, which is a single pole, triple throw switch, whose center pole is grounded. The three positions of Sensitivity Selector Switch 76 are connected to three digital inputs of Microcontroller 90, which have pull-up resistors. [This alleviates the need for the Sensitivity Range Pull-up Resistors 75 shown in FIG. 6.] By selecting one of the three positions of the switch, one of the Microcontroller 90 signal inputs is grounded, and one of the Sensitivity Ranges is selected. [Please note: in this embodiment, all the digital inputs to Microcontroller 90 from all the switches shown in FIG. 18 are "Active Low" inputs, meaning a Low signal from the switch indicates that the choice represented by that switch has been selected by the user.] This not only selects the value of the corresponding "trip-point" reference voltage, "Vtrp," but also selects the value of the corresponding "Gainctrl" gain control signal to be sent to Amplifier 36. The "Gainctrl" gain control signal selects the correct amount of amplification required of Variable Gain Amplifier 36 for the selected sensitivity range. Both the value of voltage for a given "Vtrp" and the value of amplification for a given "Gainctrl" signal will be determined through empirical testing. The software of Microcontroller 90 performs the function of Gain Range Select Circuit 74, shown in FIG. 2, to create the three "Gainctrl" gain control signals. It also performs the function of Voltage Divider Circuit 72, shown in FIG. 2, to create the three "Vtrp" voltage values from "Vref".

The Microcontroller 90 software also performs the function and decision making operation of Comparator 52 shown in FIG. 14, creating what we will refer to as a "pseudo" Comparator 52, whose output signal is CompOut (or Signal A). The purpose of the output of "pseudo" Comparator 52 is to indicate whether the Appliance, Motor, Machine, or Device Being Monitored 10 is in the "On" or "Off" state in real time. The negative input pin of "pseudo" Comparator 52 is connected to the "trip-point" reference voltage, "Vtrp," which was created by Sensitivity Selector Switch 76 and the software, as previously described. The positive input pin of "pseudo" Comparator 52 is sent the software version of the Conditioned Sensor "Moving Average" Signal, whose software derivation has been discussed. "Pseudo" Comparator 52 trips "High" (CompOut is High) when the amplitude of the Conditioned Sensor "Moving Average" Signal is above the selected "Vtrp" value to indicate that the Appliance, Motor, Machine, or Device Being Monitored 10 is operating (or is in the "On" state). "Pseudo" Comparator 52 trips "Low" (CompOut is Low) when the amplitude of the Conditioned Sensor "Moving Average" Signal falls below the selected "Vtrp" value to indicate that the Appliance, Motor, Machine, or Device Being Monitored 10 is not operating (or is in the "Off" state). [Typically, in the hardware embodiment of the invention of FIG. 14, a small amount of hysteresis is given to the trip point of Comparator 52, in order to help reduce the possibility of false triggering This is produced by using a small amount of positive feedback (which is not shown in FIG. 14) around Comparator 52. This small amount of hysteresis will be emulated by the software of Microcontroller 90.]

The software algorithm further emulates the components and operation of the Alert Condition Detection and False Alert Reduction Subsystem 210, as shown in FIG. 15. The algorithm reproduces in software, the hardware operation of Retriggerable One-Shot 212, Inverter 213, OR Gate 214, and Nonretriggerable One-Shot 216 acting upon an input signal, the software output version of pseudo" Comparator 52, CompOut (Signal A), to detect the Power-Up Transition State "Alert Condition." It then produces the software version of the Power-Up Transition State Detection Pulse (Signal C). The algorithm also reproduces in software, the hardware operation of Retriggerable One-Shot 54, OR Gate 56, and Nonretriggerable One-Shot 58 acting upon the same input signal as above, the software version of CompOut (Signal A), to detect the Power-Down Transition State "Alert Condition." It then produces the software version of the Power-Down Transition State Detection Pulse (Signal E). It also reproduces the operation of RS Flip-Flop 218 to develop the software version of the Power-On Steady State Signal (Signal F).

The software algorithm also emulates the Repetitive Alert Signal ON/OFF Duty Cycle Generation Subsystem 290 needed to create the third "Alert Method," a repetitive alert signal that repeats at some predefined frequency with some predefined "On"/"Off" duty cycle. The software emulates the three Repetitive Alert Signal Generators 292, 294, and 296 to produce repetitive pulse trains. The pulse train repetition rate, the pulse width, and the "On"/"Off" duty cycle can easily be selected by several parameters in the software. Each of the three "Alert Types," i.e., the Visual Alert Subsystem, the Audio Alert Subsystem, and the RF Alert Subsystem, will most likely have its own unique predefined repetitive pulse train, with a predefined pulse train repetition rate and "On"/"Off" duty cycle created by the software, which will be sent to the software version of Alert Selection Logic Subsystem 220. The three repetitive software pulse trains are designated: (1) Signal G for possible use by the Visual Alert Subsystem 270, (2) Signal H for possible use by the Audio Alert Subsystem 280, and (3) Signal I for possible use by the RF Alert Subsystem 60. If the repetitive alert signal "Alert Method" has been selected by the user, using Alert Selector Switch 202, for any of the three "Alert Types," the software will produce the proper repetitive pulse train signal for that selected "Alert Type."

The software algorithm additionally emulates the components and operation of the hardware version of the Alert Selection Logic Subsystem 220 described in FIG. 15 and FIG. 17. It does so by reproducing, in software, the method that the hardware version of Subsystem 220 uses to produce the correct output signals J, K, and L. The algorithm uses: (1) the input signals from the various Alert Selector Switches, including ASW1 through ASW12, as defined in FIG. 17, that have been chosen by the user of the MDMAU 20, (2) the software version of input signals A, C, E, and F that have been developed, as previously described, by the software version of the Alert Condition Detection and False Alert Reduction Subsystem 210, and (3) the software version of input signals G, H, and I developed, as previously described, by the software version of Repetitive Alert Signal ON/OFF Duty Cycle Generation Subsystem 290, to produce the correct output signals to be sent to Visual Alert Subsystem 270 (output Signal J), Audio Alert Subsystem 280 (output Signal K), and RF Alert Subsystem 60 (output Signal L). The software can emulate the various ways in which the hardware version of Alert Selection Logic Subsystem 220 uses the the hardware version of the input signals just discussed above to develop output signals J, K, and L. It will work properly with the switch arrangements shown and described in FIG. 17(a) and FIG. 17(b). In this algorithm, the software version of the Alert Selection Logic Subsystem 220 contains a logic module that prevents the Power-Down Transition State Detection Pulse from being considered legitimate unless a legitimate Power-Up Transition State Detection Pulse has occurred. This helps prevent false Power-Down Transition State Detection Alert output signals from being sent to either the Visual Alert Subsystem 270, the Audio Alert Subsystem 280, or the RF Alert Subsystem 60.

We shall now turn to the output subsystems of FIG. 18. Visual Alert Subsystem 270, which consists of Visual Device Driving Circuit 272 and Visual Output Signal Device 274, Audio Alert Subsystem 280, which consists of Audio Device Driving Circuit 282 and Audio Output Signal Device 284, and the portion of RF Alert Subsystem 60 that includes RF (Radio Frequency) Transmitter 64 and Antenna 66, remain exactly as they are in FIG. 15. Also, Address Selector 68, which allows the user to select a unique digital Address Identification Code for the Device Being Monitored 10, to be used as part of an RF Transmission, is identical to that shown in FIG. 15. However, the output signals of Address Selector 68 are sent directly to Microcontroller 90 as digital inputs. [In this embodiment, Address Selector 68 provides an eight-bit digital input signal to Microcontroller 90, which means that there are 256 unique Address Identification Codes.] In this embodiment, the software of Microcontroller 90 performs the function of Data Encoder 62 of FIG. 15, which is no longer needed, and adds this address to the RF Transmission of the MDMAU 20. When the RF Alert Subsystem is selected by the user of the MDMAU 20, Microcontroller 90 will send the correct RF Alert Signal, including the correct Address ID Code, to RF Transmitter 64 to transmit through RF Antenna 66. Also, if Visual Alert Subsystem 270 and Audio Alert Subsystem 280 are selected by the user, they will respond exactly as they did in FIG. 15 to signals J and K respectively. In this embodiment, Microcontroller 90 produces these signals rather than the hardware of FIG. 15.

Figure 19:
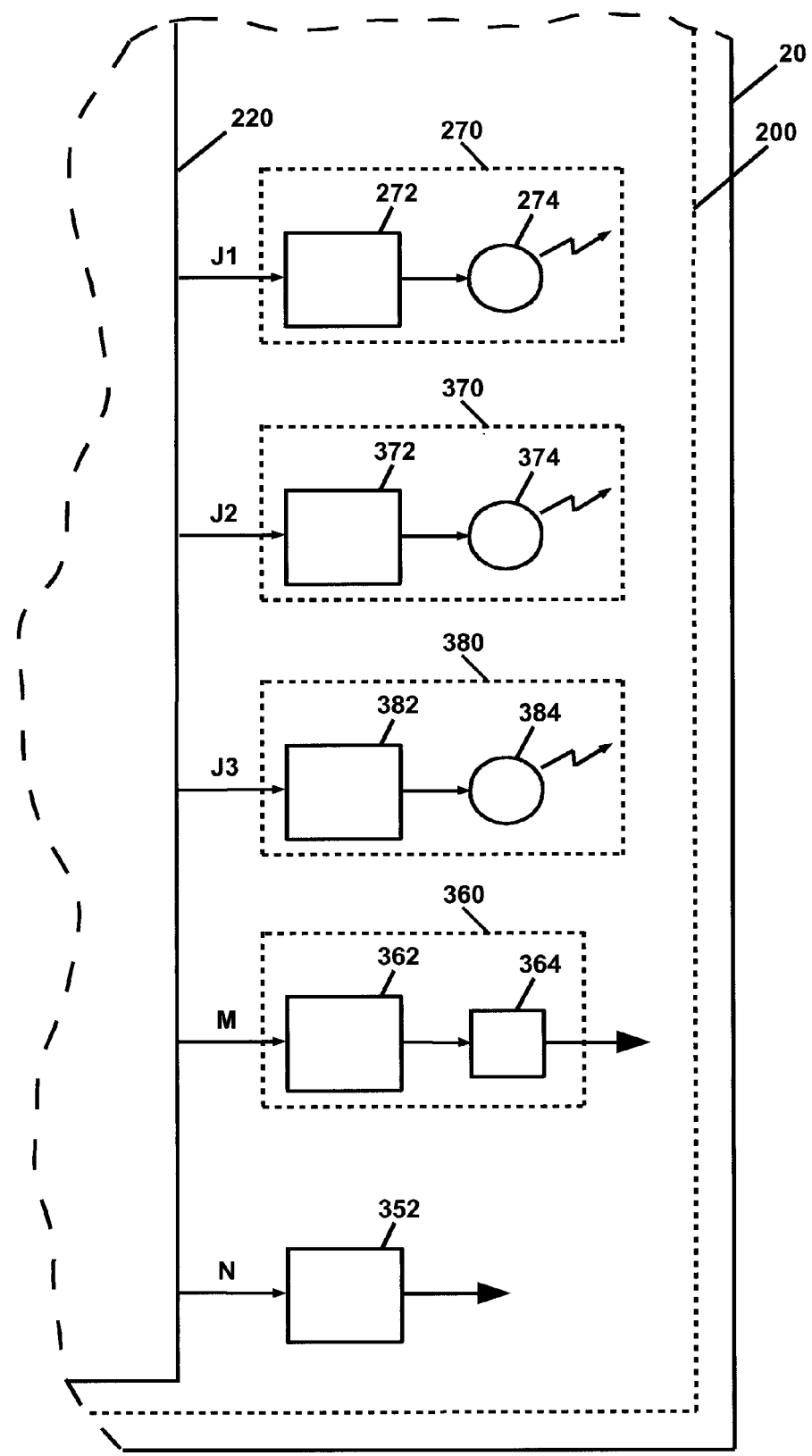
FIG. 19 is a block diagram of the electrical schematic drawing of the electronic system included in the Machine or Device Monitor and Alert Unit 20 (MDMAU 20) of another embodiment of the invention.

FIG. 19 is a block diagram of the electrical schematic drawing of the electronic system included in the Machine or Device Monitor and Alert Unit 20 (MDMAU 20) of another embodiment of the invention. FIG. 19 shows a portion of the Machine or Device Monitor and Alert Unit 20 and of RF Alert, Visual Alert, and Audio Alert Signal Creation and Selection Subsystem 200. In this embodiment, two additional Visual Alert Subsystems have been added to the original Visual Alert Subsystem, which is Visual Alert Subsystem 270, that consists of Visual Output Signal Device 274, such as a Light Emitting Diode (LED) or a Liquid Crystal Display (LCD) or an incandescent light bulb, and the appropriate Visual Device Driving Circuit 272 for that Visual Output Signal Device. The signal that drives Subsystem 270 is Signal J1 and comes from Alert Selection Logic Subsystem 220. The first additional Visual Alert Subsystem is Visual Alert Subsystem 370, which consists of Visual Output Signal Device 374, such as an LED or a Liquid Crystal Display (LCD) or an incandescent light bulb, and the appropriate Visual Device Driving Circuit 372 for that Visual Output Signal Device. The signal that drives Subsystem 370 is Signal J2 and comes from Alert Selection Logic Subsystem 220. The second additional Visual Alert Subsystem is Visual Alert Subsystem 380, which consists of Visual Output Signal Device 384, such as an LED or a Liquid Crystal Display (LCD) or an incandescent light bulb, and the appropriate Visual Device Driving Circuit 382 for that Visual Output Signal Device. The signal that drives Subsystem 380 is Signal J3 and comes from Alert Selection Logic Subsystem 220. Each of the Visual Device Driving Circuits 272, 372, and 382 could be as simple as a single transistor amplifier/switch. The three Visual Alert Subsystems can now, if desired, represent the three "Alert Conditions" defined in the discussion of FIG. 15. For example, Visual Alert Subsystem 270 can be triggered by the detection of the Power-Up Transition State Condition, Visual Alert Subsystem 370 can be triggered by the detection of the Power-On Steady State Condition, and Visual Alert Subsystem 380 can be triggered by the detection of the Power-Down Transition State Condition. Other uses could be assigned to any one of the Visual Alert Subsystems. For example, Visual Alert Subsystem 370 could be sent the digital output signal of Comparator 52, CompOut, which indicates whether, in real time, the Appliance, Motor, Machine, or Device Being Monitored 10 is in the "On" state or in the "Off" state. When the Device Being Monitored 10 is in the "On" state (CompOut is High), Visual Output Signal Device 374 could turn On, and when the Device Being Monitored 10 is in the "Off" state (CompOut is Low), Visual Output Signal Device 374 could turn Off.

In this embodiment, another additional Subsystem added is the Telephone Communication/Alert Signal Subsystem 360, which consists of Telephone Output Jack 364, such as an RJ-45 telephone jack, and the appropriate Telephone Communication Signal Driving/Interface Circuit 362, that takes digital input signals and converts them to the appropriate telephone signals. This telephone output Subsystem allows the Machine or Device Monitor and Alert Unit 20 to send (via a telephone land-line, a cellphone, or a computer network) a signal such as: (1) any of the Alert Methods previously described when an alert occurs, (2) an automatically generated e-mail Alert message, or (3) some other automatically generated message. The signal that drives this Subsystem is Signal M and comes from Alert Selection Logic Subsystem 220.

And finally, in this embodiment, the last additional circuitry added is the Digital Output Signal/Relay Driver Circuit 352. Digital Output Signal/Relay Driver Circuit 352 could be as simple as a single grounded emitter/open collector output transistor or a rail-to-rail (0 to 5 Volt) output amplifier with a source/sink capability of about 25 milliamps (mA). Several examples of how this output circuit could be used are: (1) to close a relay when an Alert occurs, or (2) to send out a 5 Volt signal when an Alert occurs using any of the Alert Methods previously described, or (3) to send out a buffered version of the output of Comparator 52, CompOut, which indicates whether, in real time, the Appliance, Motor, Machine, or Device Being Monitored 10 is in the "On" state (CompOut is High), or the "Off" state (CompOut is Low). The signal that drives Digital Output Signal/Relay Driver Circuit 352 is Signal N and comes from Alert Selection Logic Subsystem 220. All of the remaining circuitry of the MDMAU 20 for this embodiment of the invention, which is not shown in FIG. 19, acts exactly as detailed in the description of the embodiment of FIG. 14 and FIG. 15.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:
1. A machine or device monitoring system, comprising:
a monitor and alert unit configured to monitor a machine or device and produce an alert notification upon detection of a change of state, the monitor and alert unit comprising:
an operational state sensor, the operational state sensor generates signals based upon the change of state of the machine or device;
a signal conditioner, the signal conditioner receives and modifies signals generated by the operational state sensor; and
a comparator, the comparator compares amplitude of the modified signals with a predetermined amplitude trip point, the comparator generates a signal once the amplitude of the modified signal crosses the predetermined amplitude trip point for a predetermined time period to indicate the change of state of the machine or device being monitored; and
a device or system to produce an alert notification based upon the signal generated by the comparator and generate a signal indicative of the change of the state of the machine or device being monitored.

2. The monitoring system of claim 1, wherein the device or system to produce the notification upon the detection of the change of state is a visual indicator.

3. The monitoring system of claim 1, wherein the device or system to produce the notification upon the detection of the change of state is an audio indicator.

4. The monitoring system of claim 1, wherein the device or system to produce the notification upon the detection of the change of state is a wireless RF transmitter broadcasting a wireless signal to a portable receiver and alert unit configured to receive signals generated by the wireless transmitter and generate a signal indicative of the change of state of the machine or device.

5. The monitoring system of claim 1, wherein the change of state is a power-up transition state.

6. The monitoring system of claim 5, wherein an alert notification is produced when a change of state is detected and the new state is maintained for a pre-determined time period.

7. The monitoring system of claim 1, wherein the change of state is a power-down transition state.

8. The monitoring system of claim 7, wherein an alert notification is produced when a change of state is detected and the new state is maintained for a pre-determined time period.

9. The monitoring system of claim 1, wherein the change of state is from a power-on steady state.

10. The monitoring system of claim 1, wherein the operational state sensor is an electromagnetic field sensor.

11. The monitoring system of claim 10, wherein the electromagnetic field sensor can be placed in proximity of the machine or device without being attached to it.

12. The monitoring system of claim 1, wherein the alert unit comprises a selector switch configured to enable selection of power-up transition state detection, power-down transition state detection, power-on steady state detection, or some combination thereof.

13. The monitoring system of claim 1, wherein the signal indicative of the change of state of the machine or device is a visual alert, audio alert, wireless RF alert, or some combination thereof.

14. The monitoring system of claim 1, wherein the signal indicative of the change of state of the machine or device is a single pulse alert, continuous alert, or repetitive on and off alert.

15. The monitoring system of claim 1, further comprising a sensitivity selection switch and circuitry configured to cause the amplitude of the signals generated by the signal conditioner to be greater than the predetermined amplitude trip point when the machine or device being monitored is in operation.

16. The monitoring system of claim 15, wherein the sensitivity selection switch and circuitry is further configured to adjust the amplitude of the signals generated by the signal conditioner, adjust the predetermined amplitude trip point, or both.

17. The monitoring system of claim 1, wherein the modified signals generated by the signal conditioner includes a moving average amplitude that is greater than the predetermined amplitude trip point when the machine or device being monitored is in operation.

18. The monitoring system of claim 17, wherein the signal conditioner includes a limiter for limiting amplitude.

19. The monitoring system of claim 17, wherein the signal conditioner includes a rectifier and a low pass filter.

20. The monitoring system of claim 1, wherein the operational state sensor senses velocity or acceleration along multiple axes and generates signals indicative of said velocity or acceleration for each of said multiple axes.

21. The monitoring system of claim 20, wherein the signal conditioner includes a signal combining circuit that sums the signals generated by the operational state sensor.

22. The monitoring system of claim 21, wherein the signal combining circuit further determines a square root of the sum of the squares of the signals generated by the operational state sensor.

23. The monitoring system of claim 1, wherein the operational state sensor comprises a vibration sensor.

24. The monitoring system of claim 1, wherein the operational state sensor comprises a velocity sensor.

25. The monitoring system of claim 1, wherein the operational state sensor comprises an accelerometer sensor.

26. The monitoring system of claim 25, wherein the accelerometer sensor generates signals indicative of acceleration along three axes.

27. The monitoring system of claim 1, wherein the operational state sensor comprises an audio sensor.

28. The monitoring system of claim 27, wherein the audio sensor can be placed in proximity of the machine or device without being attached to it.

29. The monitoring system of claim 1, wherein the operational state sensor comprises a magnetic field sensor.

30. The monitoring system of claim 29, wherein the magnetic field sensor can be placed in proximity of the machine or device without being attached to it.

31. The monitoring system of claim 29, wherein the magnetic field sensor is disposed about a power cord of a machine or device.

32. A method of monitoring a change of state of a machine or device, comprising the steps of:
connecting an operational state sensor to a machine or device, wherein the operational state sensor generates signals based upon change of states of the machine or device;
conditioning the signals generated by the operational state sensor to form a moving average amplitude that is greater than an amplitude setting of a predetermined amplitude trip point when the machine or device is in operation;
monitoring time periods after the moving average amplitude crosses the amplitude setting of the predetermined amplitude trip point to indicate the change of state of the machine or device being monitored, wherein an alert notification is produced when a change of state is detected and the new state is maintained for a pre-determined time period.

33. The method of claim 32, wherein the device or system to produce the notification upon the detection of the change of state is a visual indicator.

34. The method of claim 32, wherein the device or system to produce the notification upon the detection of the change of state is an audio indicator.

35. The method of claim 32, wherein the device or system to produce the notification upon the detection of the change of state is a wireless transmitter broadcasting a wireless signal to a portable receiver and alert unit configured to receive signals generated by the wireless transmitter and generate a signal indicative of the change of state of the machine or device.

36. The method of claim 32, further comprising the step of adjusting the amplitude of the average amplitude, adjusting the amplitude of the predetermined amplitude trip point, or both.

37. A machine or device monitoring system, comprising:
a monitor and alert unit configured to monitor a machine or device and produce an alert notification upon detection of a change of state, the monitor and alert unit comprising:
an operational state sensor, wherein the operational state sensor generates signals based upon the change of state of the machine or device;
a signal conditioner, wherein the signal conditioner receives and modifies signals generated by the operational state sensor;
a comparator, the comparator compares amplitude of the modified signals with a predetermined amplitude trip point, the comparator generates a signal once the amplitude of the modified signal crosses the predetermined amplitude trip point for a predetermined time period to indicate the change of state of the machine or device being monitored; and an output.

38. The system of claim 37, wherein the output is a telephone interface output.

39. The system of claim 37, wherein the output is an electrical signal output circuit.

* * * * *